United States Patent
Grunnet-Jepsen et al.

(10) Patent No.: US 8,913,003 B2
(45) Date of Patent: Dec. 16, 2014

(54) FREE-SPACE MULTI-DIMENSIONAL ABSOLUTE POINTER USING A PROJECTION MARKER SYSTEM

(75) Inventors: Anders Grunnet-Jepsen, San Jose, CA (US); John Sweetser, San Jose, CA (US); Kenneth Salsman, Pleasanton, CA (US)

(73) Assignee: Thinkoptics, Inc., San Jose, CA (US)

( * ) Notice: Subject to any disclaimer, the term of this patent is extended or adjusted under 35 U.S.C. 154(b) by 993 days.

(21) Appl. No.: 11/777,073

(22) Filed: Jul. 12, 2007

(65) Prior Publication Data

US 2008/0012824 A1     Jan. 17, 2008

Related U.S. Application Data

(60) Provisional application No. 60/831,735, filed on Jul. 17, 2006.

(51) Int. Cl.
*G09G 5/00*     (2006.01)
*G06F 3/042*     (2006.01)

(52) U.S. Cl.
CPC .................................. *G06F 3/0421* (2013.01)
USPC ........................................................ 345/156

(58) Field of Classification Search
CPC ................................................ G09G 2370/18
USPC ................................................ 345/156–169
See application file for complete search history.

(56) References Cited

U.S. PATENT DOCUMENTS

| | | |
|---|---|---|
| 4,229,009 A | 10/1980 | Ohta |
| 4,285,523 A | 8/1981 | Lemelson |
| 4,395,045 A | 7/1983 | Baer |
| 4,813,682 A | 3/1989 | Okada |
| 4,955,812 A | 9/1990 | Hill |
| 4,959,721 A | 9/1990 | Micic et al. |
| 4,964,837 A | 10/1990 | Collier |
| 5,009,501 A | 4/1991 | Fenner et al. |

(Continued)

FOREIGN PATENT DOCUMENTS

| | | |
|---|---|---|
| CN | 1338961 A | 3/2002 |
| CN | 1559644 A | 1/2005 |

(Continued)

OTHER PUBLICATIONS

International Search Report mailed Jan. 30, 2008, for International Patent Application No. PCT/US07/15955, filed Jul. 13, 2007, 4 pages.

(Continued)

*Primary Examiner* — Waseem Moorad
(74) *Attorney, Agent, or Firm* — Blakely, Sokoloff, Taylor & Zafman LLP

(57) ABSTRACT

Methods and apparatuses for a free-space multi-dimensional absolute pointer using a projection marker system are described herein. In one embodiment, a presentation system includes, but is not limited to, a projection-based marker apparatus to project one or more optical spots on a display surface for displaying machine generated content capable of being manipulated via a cursor of a pointing device, a handheld device to wirelessly capture the projected optical spots from the display surface, and a control unit communicatively coupled to the projection-based marker apparatus and the handheld device to determine coordinates of the cursor based on characteristics of the captured light spots. Other methods and apparatuses are also described.

25 Claims, 10 Drawing Sheets

(56) References Cited

U.S. PATENT DOCUMENTS

| | | | |
|---|---|---|---|
| 5,023,943 A | 6/1991 | Heberle |
| 5,027,132 A | 6/1991 | Manns |
| 5,045,843 A | 9/1991 | Per |
| 5,115,230 A | 5/1992 | Smoot |
| 5,130,693 A | 7/1992 | Gigandet |
| 5,170,002 A | 12/1992 | Suzuki et al. |
| 5,181,015 A | 1/1993 | Marshall et al. |
| 5,181,181 A | 1/1993 | Glynn |
| 5,187,540 A | 2/1993 | Morrison |
| 5,227,985 A | 7/1993 | DeMenthon |
| 5,237,617 A | 8/1993 | Miller |
| 5,297,061 A | 3/1994 | Dementhon |
| 5,309,137 A | 5/1994 | Kajiwara |
| 5,317,140 A | 5/1994 | Dunthorn |
| 5,319,387 A | 6/1994 | Yoshikawa |
| 5,353,042 A | 10/1994 | Klapman |
| 5,371,802 A | 12/1994 | McDonald et al. |
| 5,388,059 A | 2/1995 | DeMenthon |
| 5,394,326 A | 2/1995 | Liu |
| 5,396,281 A | 3/1995 | Maeda |
| 5,424,556 A | 6/1995 | Symosek et al. |
| 5,457,478 A | 10/1995 | Frank |
| 5,502,459 A | 3/1996 | Marshall et al. |
| 5,502,568 A | 3/1996 | Ogawa et al. |
| 5,504,501 A | 4/1996 | Hauck et al. |
| 5,506,605 A | 4/1996 | Paley |
| 5,510,811 A | 4/1996 | Tobey et al. |
| 5,510,893 A | 4/1996 | Suzuki |
| 5,515,079 A | 5/1996 | Hauck |
| 5,557,690 A | 9/1996 | O'Gorman |
| 5,574,479 A | 11/1996 | Odell |
| 5,581,372 A | 12/1996 | Kerz |
| 5,594,807 A | 1/1997 | Liu |
| 5,608,528 A | 3/1997 | Ogawa |
| 5,627,565 A | 5/1997 | Morishita et al. |
| 5,694,495 A | 12/1997 | Hara et al. |
| 5,707,237 A | 1/1998 | Takemoto et al. |
| 5,724,106 A | 3/1998 | Autry et al. |
| 5,733,201 A | 3/1998 | Caldwell et al. |
| 5,736,947 A | 4/1998 | Imanaka |
| 5,736,974 A | 4/1998 | Selker |
| 5,736,975 A | 4/1998 | Lunetta |
| 5,754,094 A | 5/1998 | Frushour |
| 5,793,353 A | 8/1998 | Wu |
| 5,793,361 A | 8/1998 | Kahn et al. |
| 5,796,387 A | 8/1998 | Curran et al. |
| 5,805,165 A | 9/1998 | Thorne, III et al. |
| 5,832,139 A | 11/1998 | Batterman et al. |
| 5,860,648 A | 1/1999 | Petermeier et al. |
| 5,883,569 A | 3/1999 | Kolefas |
| 5,900,863 A | 5/1999 | Numazaki |
| 5,917,472 A | 6/1999 | Perälä |
| 5,926,168 A * | 7/1999 | Fan ................ 345/158 |
| 5,929,444 A | 7/1999 | Leichner |
| 5,953,077 A | 9/1999 | Honey et al. |
| 5,963,145 A | 10/1999 | Escobosa |
| 5,973,618 A | 10/1999 | Ellis |
| 5,973,757 A | 10/1999 | Aubuchon et al. |
| 5,983,161 A | 11/1999 | Lemelson et al. |
| 5,986,644 A | 11/1999 | Herder et al. |
| 5,999,166 A | 12/1999 | Rangan |
| 6,008,800 A | 12/1999 | Pryor |
| 6,008,899 A | 12/1999 | Trebino et al. |
| 6,037,936 A | 3/2000 | Ellenby et al. |
| 6,045,446 A | 4/2000 | Ohshima |
| 6,061,055 A | 5/2000 | Marks |
| 6,061,644 A | 5/2000 | Leis |
| 6,067,079 A | 5/2000 | Shieh |
| 6,091,378 A | 7/2000 | Richardson et al. |
| 6,094,189 A | 7/2000 | Quillen et al. |
| 6,097,374 A | 8/2000 | Howard |
| 6,110,039 A | 8/2000 | Oh |
| 6,115,128 A | 9/2000 | Vann |
| 6,125,190 A | 9/2000 | Wen |
| 6,146,278 A * | 11/2000 | Kobayashi ............ 345/156 |
| 6,184,863 B1 | 2/2001 | Sibert et al. |
| 6,188,388 B1 | 2/2001 | Arita et al. |
| 6,244,956 B1 | 6/2001 | Nakayama et al. |
| 6,251,011 B1 | 6/2001 | Yamazaki |
| 6,252,720 B1 | 6/2001 | Haseltine |
| 6,259,431 B1 | 7/2001 | Futatsugi et al. |
| 6,281,878 B1 | 8/2001 | Montellese |
| 6,287,198 B1 | 9/2001 | McCauley |
| 6,295,051 B1 | 9/2001 | Kanevsky et al. |
| 6,317,784 B1 | 11/2001 | Mackintosh et al. |
| 6,324,255 B1 | 11/2001 | Kondo |
| 6,324,296 B1 | 11/2001 | McSheery et al. |
| 6,331,848 B1 | 12/2001 | Stove et al. |
| 6,373,961 B1 | 4/2002 | Richardson et al. |
| 6,377,242 B1 | 4/2002 | Sweed |
| 6,404,416 B1 | 6/2002 | Kahn et al. |
| 6,429,856 B1 | 8/2002 | Omura |
| 6,445,409 B1 | 9/2002 | Ito |
| 6,456,892 B1 | 9/2002 | Dara-Abrams |
| 6,489,945 B1 | 12/2002 | Gordon |
| 6,515,651 B1 | 2/2003 | Berstis |
| 6,540,607 B2 | 4/2003 | Mokris |
| 6,545,661 B1 | 4/2003 | Goschy |
| 6,559,935 B1 * | 5/2003 | Tew ................ 356/139.03 |
| 6,600,475 B2 | 7/2003 | Gutta et al. |
| 6,603,880 B2 | 8/2003 | Sakamoto |
| 6,618,076 B1 | 9/2003 | Sukthankar et al. |
| 6,641,269 B2 | 11/2003 | Kitazawa |
| 6,650,822 B1 | 11/2003 | Zhou |
| 6,660,475 B2 | 12/2003 | Jack et al. |
| 6,664,948 B2 | 12/2003 | Crane |
| 6,677,987 B1 | 1/2004 | Girod |
| 6,683,628 B1 | 1/2004 | Nakagawa et al. |
| 6,724,368 B2 | 4/2004 | Strubbe |
| 6,727,885 B1 * | 4/2004 | Ishino et al. ............ 345/156 |
| 6,727,887 B1 | 4/2004 | Levine et al. |
| 6,753,849 B1 | 6/2004 | Curran |
| 6,757,446 B1 | 6/2004 | Li |
| 6,765,555 B2 | 7/2004 | Wu |
| 6,765,608 B1 | 7/2004 | Himeda |
| 6,766,036 B1 | 7/2004 | Pryor |
| 6,766,066 B2 | 7/2004 | Kitazawa |
| 6,791,531 B1 | 9/2004 | Johnston |
| 6,795,068 B1 | 9/2004 | Marks |
| 6,811,489 B1 | 11/2004 | Shimizu |
| 6,844,871 B1 | 1/2005 | Hinckley et al. |
| 6,847,348 B2 | 1/2005 | Rojewski |
| 6,881,147 B2 | 4/2005 | Naghi et al. |
| 6,890,262 B2 | 5/2005 | Oishi |
| 6,900,791 B2 | 5/2005 | Tanaka et al. |
| 6,924,809 B2 | 8/2005 | Chao et al. |
| 6,926,610 B2 | 8/2005 | Kobayashi |
| 6,955,598 B2 | 10/2005 | Hagiwara |
| 6,956,503 B2 | 10/2005 | Yokokohji |
| 6,973,202 B2 | 12/2005 | Mostafavi |
| 6,975,301 B2 | 12/2005 | Fan |
| 6,978,037 B1 | 12/2005 | Fechner et al. |
| 6,982,697 B2 | 1/2006 | Wilson |
| 6,990,639 B2 | 1/2006 | Wilson |
| 7,039,218 B2 | 5/2006 | Lin |
| 7,050,043 B2 | 5/2006 | Huang et al. |
| 7,053,798 B2 | 5/2006 | Popineau |
| 7,053,932 B2 | 5/2006 | Lin et al. |
| 7,061,468 B2 | 6/2006 | Tiphane |
| 7,064,742 B2 | 6/2006 | Navab |
| 7,069,516 B2 | 6/2006 | Rekimoto |
| 7,071,908 B2 | 7/2006 | Guttag |
| 7,091,949 B2 | 8/2006 | Hansen et al. |
| 7,102,616 B1 | 9/2006 | Sleator |
| 7,105,795 B2 | 9/2006 | Cartlidge |
| 7,130,469 B2 | 10/2006 | Adachi |
| 7,133,031 B2 | 11/2006 | Wang |
| 7,136,053 B2 | 11/2006 | Hendriks |
| 7,139,983 B2 | 11/2006 | Kelts |
| 7,158,118 B2 | 1/2007 | Liberty |
| 7,158,181 B2 | 1/2007 | Cartlidge |
| 7,161,596 B2 | 1/2007 | Hoile |
| 7,170,492 B2 | 1/2007 | Bell |
| 7,176,905 B2 | 2/2007 | Baharav |

(56) References Cited

U.S. PATENT DOCUMENTS

| | | |
|---|---|---|
| 7,215,322 B2 | 5/2007 | Genc |
| 7,227,526 B2 | 6/2007 | Hildreth |
| 7,232,986 B2 | 6/2007 | Worthington et al. |
| 7,262,760 B2 | 8/2007 | Liberty |
| 7,268,774 B2 | 9/2007 | Pittel |
| 7,292,151 B2 | 11/2007 | Ferguson et al. |
| 7,414,596 B2 | 8/2008 | Satoh |
| 7,414,611 B2 | 8/2008 | Liberty |
| 7,417,719 B2 | 8/2008 | Michelsson |
| 7,430,303 B2 | 9/2008 | Sefcik |
| 7,440,610 B1 | 10/2008 | Wirtz |
| 7,457,439 B1 | 11/2008 | Madsen |
| 7,542,072 B2 | 6/2009 | DeMenthon |
| 7,773,076 B2 | 8/2010 | Pittel |
| 7,787,992 B2 | 8/2010 | Pretlove |
| 7,796,116 B2 * | 9/2010 | Salsman et al. ............... 345/158 |
| 7,800,585 B2 | 9/2010 | Gordon |
| 7,852,317 B2 | 12/2010 | Grunnet-Jepsen |
| 7,859,523 B2 | 12/2010 | Kong |
| 7,864,159 B2 | 1/2011 | Sweetser et al. |
| 7,869,618 B2 | 1/2011 | Thelen |
| 7,893,924 B2 | 2/2011 | Lieberman |
| 7,912,286 B2 | 3/2011 | Ozaki et al. |
| 7,927,216 B2 | 4/2011 | Ikeda et al. |
| 7,940,986 B2 | 5/2011 | Mekenkamp |
| 8,095,200 B2 | 1/2012 | Quaid, III |
| 2001/0010514 A1 | 8/2001 | Ishino |
| 2001/0030668 A1 | 10/2001 | Erten |
| 2001/0045940 A1 | 11/2001 | Hansen |
| 2002/0011987 A1* | 1/2002 | Kitazawa .................. 345/156 |
| 2002/0056136 A1 | 5/2002 | Wistendahl |
| 2002/0078446 A1 | 6/2002 | Dakss et al. |
| 2002/0085097 A1 | 7/2002 | Colmenarez |
| 2002/0098887 A1 | 7/2002 | Himoto |
| 2002/0103617 A1 | 8/2002 | Uchiyama |
| 2002/0107069 A1 | 8/2002 | Ishino |
| 2002/0135565 A1 | 9/2002 | Gordon et al. |
| 2003/0017872 A1 | 1/2003 | Oishi |
| 2003/0048280 A1 | 3/2003 | Russell |
| 2003/0144056 A1 | 7/2003 | Leifer |
| 2003/0189545 A1 | 10/2003 | Trajkovic et al. |
| 2003/0199324 A1 | 10/2003 | Wang |
| 2003/0216176 A1 | 11/2003 | Shimizu et al. |
| 2004/0004276 A1 | 1/2004 | Hsu et al. |
| 2004/0016939 A1 | 1/2004 | Akiba et al. |
| 2004/0017357 A1 | 1/2004 | Kinoshita et al. |
| 2004/0017473 A1 | 1/2004 | Marks |
| 2004/0046736 A1 | 3/2004 | Pryor |
| 2004/0046744 A1 | 3/2004 | Rafii et al. |
| 2004/0063481 A1 | 4/2004 | Wang |
| 2004/0095317 A1 | 5/2004 | Zhang et al. |
| 2004/0151218 A1 | 8/2004 | Branzoi |
| 2004/0160420 A1 | 8/2004 | Baharav |
| 2004/0169639 A1 * | 9/2004 | Pate et al. ............... 345/157 |
| 2004/0174340 A1 | 9/2004 | Bruneau |
| 2004/0174569 A1 | 9/2004 | Karito |
| 2004/0196451 A1 | 10/2004 | Aoyama |
| 2004/0207597 A1 | 10/2004 | Marks |
| 2004/0222969 A1 | 11/2004 | Buchenrieder |
| 2004/0239670 A1 | 12/2004 | Marks |
| 2004/0246229 A1 | 12/2004 | Yamada |
| 2004/0266528 A1 | 12/2004 | Wang |
| 2004/0268393 A1 | 12/2004 | Hunleth et al. |
| 2005/0026689 A1 | 2/2005 | Marks |
| 2005/0028191 A1 | 2/2005 | Sullivan et al. |
| 2005/0052415 A1 | 3/2005 | Braun |
| 2005/0059488 A1 | 3/2005 | Larsen |
| 2005/0073525 A1 | 4/2005 | Chao et al. |
| 2005/0104632 A1 | 5/2005 | Lettvin |
| 2005/0104849 A1 | 5/2005 | Hoile |
| 2005/0137774 A1 | 6/2005 | Rupp |
| 2005/0168444 A1 | 8/2005 | Lin et al. |
| 2005/0200351 A1 | 9/2005 | Shimizu |
| 2005/0225536 A1 | 10/2005 | Hsieh et al. |
| 2005/0237303 A1 | 10/2005 | Yang |
| 2005/0244034 A1 | 11/2005 | Miyahara |
| 2005/0272502 A1 | 12/2005 | Marks |
| 2006/0007142 A1 | 1/2006 | Wilson et al. |
| 2006/0023111 A1 | 2/2006 | DeMenthon |
| 2006/0028442 A1 | 2/2006 | Bynum et al. |
| 2006/0047472 A1 | 3/2006 | Krumm |
| 2006/0049930 A1 | 3/2006 | Zruya |
| 2006/0082546 A1 | 4/2006 | Wey |
| 2006/0094286 A1 | 5/2006 | Lee et al. |
| 2006/0105842 A1 | 5/2006 | Kim |
| 2006/0108507 A1 | 5/2006 | Huang |
| 2006/0125932 A1 | 6/2006 | Lu et al. |
| 2006/0148563 A1 | 7/2006 | Yang |
| 2006/0152487 A1 | 7/2006 | Grunnet-Jepsen et al. |
| 2006/0152489 A1 | 7/2006 | Sweetser et al. |
| 2006/0267935 A1 | 11/2006 | Corson |
| 2006/0284841 A1 | 12/2006 | Hong et al. |
| 2007/0002037 A1 | 1/2007 | Kuroki |
| 2007/0060228 A1 | 3/2007 | Akasaka |
| 2007/0066394 A1 | 3/2007 | Ikeda et al. |
| 2007/0089915 A1 | 4/2007 | Ogawa |
| 2007/0124694 A1 | 5/2007 | Van De Sluis et al. |
| 2007/0155502 A1 | 7/2007 | Wu |
| 2007/0176908 A1 | 8/2007 | Lipman |
| 2007/0188447 A1 | 8/2007 | Wu |
| 2007/0211027 A1 | 9/2007 | Ohta |
| 2007/0298882 A1 | 12/2007 | Marks |
| 2008/0094354 A1 | 4/2008 | Thelen |
| 2008/0100574 A1 | 5/2008 | Lou et al. |
| 2008/0174550 A1 | 7/2008 | Laurila |
| 2008/0188959 A1 | 8/2008 | Kneissler |
| 2008/0204404 A1 | 8/2008 | Kneissler et al. |
| 2009/0085869 A1 | 4/2009 | Destura et al. |
| 2009/0128815 A1 | 5/2009 | Draaijer et al. |
| 2009/0295595 A1 | 12/2009 | Thelen et al. |
| 2009/0300535 A1 | 12/2009 | Skourup |
| 2010/0073289 A1 | 3/2010 | Kneissler |

FOREIGN PATENT DOCUMENTS

| | | |
|---|---|---|
| DE | 3930581 | 3/1991 |
| DE | 19701344 | 7/1997 |
| DE | 19701374 | 7/1997 |
| DE | 19648487 C1 | 6/1998 |
| DE | 19814254 | 10/1998 |
| DE | 19937307 | 2/2000 |
| DE | 10029173 | 1/2002 |
| DE | 10241392 A1 | 5/2003 |
| DE | 10219198 A1 | 11/2003 |
| EP | 0 852 961 A1 | 7/1998 |
| EP | 0 993 845 A2 | 4/2000 |
| EP | 1 062 994 A2 | 12/2000 |
| EP | 1 062 994 A3 | 12/2000 |
| EP | 1 081 635 | 3/2001 |
| EP | 1081635 | 3/2001 |
| EP | 1279425 A2 | 1/2003 |
| EP | 1 293 237 A2 | 3/2003 |
| EP | 1 450 243 A2 | 8/2004 |
| GB | 1524334 | 9/1978 |
| GB | 2 244 546 A | 12/1991 |
| GB | 2 284 478 A | 6/1995 |
| GB | 2 307 133 A | 5/1997 |
| GB | 2 316 482 A | 2/1998 |
| GB | 2319374 A | 5/1998 |
| GB | 2381686 | 5/2003 |
| JP | 60-77231 | 5/1985 |
| JP | 62-14527 | 1/1987 |
| JP | 03-074434 | 7/1991 |
| JP | 03-059619 | 9/1991 |
| JP | 05-056191 | 5/1993 |
| JP | 06-050758 | 2/1994 |
| JP | 06-154422 | 6/1994 |
| JP | 06-190144 | 7/1994 |
| JP | 3000028 | 7/1994 |
| JP | 06-273058 | 9/1994 |
| JP | 06-308879 A | 11/1994 |
| JP | 07-028591 | 1/1995 |
| JP | 07-044315 | 2/1995 |
| JP | 07-107573 | 4/1995 |

(56) References Cited

FOREIGN PATENT DOCUMENTS

| | | |
|---|---|---|
| JP | 07-115690 | 5/1995 |
| JP | 07121293 | 5/1995 |
| JP | 07-146123 | 6/1995 |
| JP | 07-200142 | 8/1995 |
| JP | H7-230354 | 8/1995 |
| JP | 07-262797 | 10/1995 |
| JP | 07-302148 A | 11/1995 |
| JP | 07-318332 | 12/1995 |
| JP | 08-071252 A | 3/1996 |
| JP | 08-095704 | 4/1996 |
| JP | 08-106352 | 4/1996 |
| JP | 08-111144 | 4/1996 |
| JP | 08-114415 | 5/1996 |
| JP | 08-122070 | 5/1996 |
| JP | 08-152959 | 6/1996 |
| JP | 08-211993 | 8/1996 |
| JP | 08-292998 | 11/1996 |
| JP | 08-305355 | 11/1996 |
| JP | 08-335136 | 12/1996 |
| JP | 09-166417 A | 6/1997 |
| JP | 09-230997 | 9/1997 |
| JP | 09-265346 | 10/1997 |
| JP | 09-274534 | 10/1997 |
| JP | 09-319510 | 12/1997 |
| JP | 10-021000 | 1/1998 |
| JP | 10-033831 | 2/1998 |
| JP | 10-099542 | 4/1998 |
| JP | H10-154038 | 6/1998 |
| JP | 10-228349 A | 8/1998 |
| JP | H10-228349 | 8/1998 |
| JP | 10-254614 | 9/1998 |
| JP | 11-053994 | 2/1999 |
| JP | 11-099284 | 4/1999 |
| JP | 11-114223 | 4/1999 |
| JP | 11-307243 | 5/1999 |
| JP | 2901476 | 6/1999 |
| JP | 11-305935 A | 11/1999 |
| JP | 2000-063230 | 2/2000 |
| JP | 2000-270237 | 9/2000 |
| JP | 2000-308756 | 11/2000 |
| JP | 2001-038052 | 2/2001 |
| JP | 2001-104643 | 4/2001 |
| JP | 3078268 B2 | 4/2001 |
| JP | 2001-175412 | 6/2001 |
| JP | 2001-236181 A | 8/2001 |
| JP | 2002-224444 | 8/2001 |
| JP | 3194841 B2 | 8/2001 |
| JP | 2001-306245 A | 11/2001 |
| JP | 3228845 B2 | 11/2001 |
| JP | 2001-356875 A | 12/2001 |
| JP | 2002-062981 | 2/2002 |
| JP | 2002-082751 | 3/2002 |
| JP | 2002-091642 | 3/2002 |
| JP | 3262677 | 3/2002 |
| JP | 3273531 | 4/2002 |
| JP | 2002-153673 | 5/2002 |
| JP | 2002-202843 | 7/2002 |
| JP | 2002-232549 | 8/2002 |
| JP | 2002-233665 | 8/2002 |
| JP | 2004-139206 | 10/2002 |
| JP | 2002/032770 | 11/2002 |
| JP | 2003-053038 | 2/2003 |
| JP | 2003044220 | 2/2003 |
| JP | 2003-083715 | 3/2003 |
| JP | 2003-140823 | 5/2003 |
| JP | 3422383 | 6/2003 |
| JP | 2003-208260 | 7/2003 |
| JP | 2005-040493 A | 7/2003 |
| JP | 2003-279799 A | 10/2003 |
| JP | 2003-325974 | 11/2003 |
| JP | 2004-062774 | 2/2004 |
| JP | 2004-070502 A | 3/2004 |
| JP | 3517482 B2 | 4/2004 |
| JP | 2004/139206 | 5/2004 |
| JP | 2004-191906 A | 7/2004 |
| JP | 2004-310074 | 11/2004 |
| JP | 2004-313492 | 11/2004 |
| JP | 2004-348459 | 12/2004 |
| JP | 2005-025170 | 1/2005 |
| JP | 2005-040493 A | 2/2005 |
| JP | 2005-063230 | 3/2005 |
| JP | 2006-113019 | 4/2006 |
| JP | 2006-136694 | 6/2006 |
| JP | 2007-083024 A | 4/2007 |
| JP | 2007-283134 A | 11/2007 |
| NL | 9300171 A | 8/1994 |
| RU | 2 125 853 C1 | 2/1994 |
| RU | 2 126 161 C1 | 2/1999 |
| RU | 2 141 738 C1 | 11/1999 |
| WO | WO 94/02931 | 2/1994 |
| WO | WO-95/19031 | 7/1995 |
| WO | WO 95/19031 | 7/1995 |
| WO | WO 96/05766 | 2/1996 |
| WO | WO 97/09101 | 3/1997 |
| WO | WO 97/12337 | 4/1997 |
| WO | WO 97/17598 | 5/1997 |
| WO | WO 97/28864 | 8/1997 |
| WO | WO 97/32641 A1 | 9/1997 |
| WO | WO 97041502 | 11/1997 |
| WO | WO 98/11528 | 3/1998 |
| WO | WO 99/58214 A1 | 11/1999 |
| WO | WO 00/33168 | 6/2000 |
| WO | WO 00/35345 | 6/2000 |
| WO | WO-0060534 | 10/2000 |
| WO | WO 01/87426 A2 | 11/2001 |
| WO | WO 01/91042 A3 | 11/2001 |
| WO | WO 02/17054 A1 | 2/2002 |
| WO | WO 03/015005 A2 | 2/2003 |
| WO | WO 03/056505 A1 | 7/2003 |
| WO | WO 03/088147 A1 | 10/2003 |
| WO | WO 03/107260 A2 | 12/2003 |
| WO | WO 2004012130 | 2/2004 |
| WO | WO-2004012130 | 2/2004 |
| WO | WO 2004/039055 A2 | 5/2004 |
| WO | WO-2004038328 | 5/2004 |
| WO | WO 2004/051391 A2 | 6/2004 |
| WO | WO 2005/013115 | 2/2005 |
| WO | WO-2005013115 | 2/2005 |
| WO | WO 2005/040493 A1 | 5/2005 |
| WO | WO 2005/073838 | 8/2005 |
| WO | WO 2006/076557 A2 | 7/2006 |
| WO | WO 2006/076557 A3 | 7/2006 |
| WO | WO 2007/063449 A1 | 6/2007 |
| WO | WO 2007/105133 A1 | 9/2007 |
| WO | WO 2007105132 | 9/2007 |
| WO | WO 2008/065579 A2 | 6/2008 |
| WO | WO 2008/065601 A2 | 6/2008 |

OTHER PUBLICATIONS

Final Office Action from U.S. Appl. No. 11/777,078, mailed Jun. 10, 2010, 13 pages.

Notice of Allowance from U.S. Appl. No. 11/187,387, mailed Aug. 23, 2010, 9 pages.

Notice of Allowance from U.S. Appl. No. 11/187,435, mailed Sep. 2, 2010, 11 pages.

Office Action from U.S. Appl. No. 11/187,387, mailed Feb. 4, 2010, pp. 17.

Office Action for counterpart European Patent Application No. 06718289.9, mailed Jul. Sep. 7, 2009, 5 pages.

Notice of Allowance from U.S. Appl. No. 11/187,435, mailed May 3, 2010, 13 pages.

Notice of Allowance from U.S. Appl. No. 11/187,405, mailed Apr. 29, 2010, 18 pages.

Second Office Action from foreign counterpart China Patent Application No. 200680006415.3 mailed Oct. 8, 2010, pp. 6.

Odell, D., FAM 18.5, "An Optical Pointer for Infrared Remote Controllers", IEEE, 1995, pp. 324-325.

Vellgdan, J., "Unique Interactive Projection Display Screen", BNL-64780, U.S. Air Force P.R.A.M. office and by D.A.R.P.A, pp. 9.

Aihara, T., et al., "Wireless Pointing Device", IBM Technical Disclosure Bulletin, vol. 36, No. 06B, Jun. 1993, pp. 345-346.

(56) References Cited

OTHER PUBLICATIONS

Office Action for counterpart European Patent Application No. 06718289.9, mailed Mar. 9, 2008, 6 pages.
Danish Patent and Trademark Office, Novelty Search Dec. 20, 2006, SE2006 05704., 11 pages.
Office Action from Foreign Counterpart China Patent Application No. 200680006415.3, mailed Jul. 22, 2009, 2 pgs.
Moore, Stan, "Optimal Pixel Size", http://www.stanmooreastro.com/pixel_size.htm, 2004, pp. 1-5.
European Office Action, 06718289.9 mailed Jul. 19, 2011, 6 pages.
Third Office Action of Chinese Patent Application 200680006 415.3, mailed Aug. 12, 2011, 5 pages.
Office Action for counterpart Japanese Patent Application JP 2007-551393 mailed Sep. 15, 2011, 2 pages, Office Action and English summary.
Notice of Allowance for U.S. Appl. No. 12/115,251 mailed Nov. 4, 2011, 5 pages.
Office Action from U.S. Appl. No. 11/187,387, Mailed Feb. 4, 2010., 17 pages.
PCT International Search Report and Written Opinion of the International Searching Authority, Mailed Oct. 30, 2006., 14 pages.
PCT International Search Report and Written Opinion of the International Searching Authority, Mailed Jul. 17, 2007., 11 pages.
Sukthankar, R., et al., "Smarter Presentations: Exploiting Homography in Camera-Projector Systems," *Proceedings of International Conference on Computer Vision*, 2001., 7 pages.
Madritsch, F., "CCD—Camera Based Optical Tracking for Human-Computer Interaction." *Proceedings 1st European Conference on Disability, Virtual Reality and Associated Technologies, Maidenhead*, 1996, pp. 161-170.
Olsen, Jr. D., et al., "Laser Pointer Interaction," *Proceedings of the SIGCHI Conference on Human Factors in Computing Systems*, 2001, Seattle, WA., 7 pages.
Myers, B., et al., "Interacting at a Distance: Measuring the Performance of Laser Pointers and Other Devices," vol. 4: Issue 1, *Proceedings of CHI* Apr. 2002, Minneapolis, Minnesota, pp. 33-40.
Agilent Technologies, "*Agilent ADNB-6031 and ADNB-6032 Low Power Laser Mouse Bundles: Datasheet*," http://www.agilent.com/semiconductors. May 27, 2005, pp. 1-45, Agilent Technologies.
Agilent Technologies, "*Agilent ADNK-2623 Optical Mouse Designer's Kit: Product Overview*," http://www.agilent.com/semiconductors. Jul. 3, 2003. Agilent Technologies., 4 pages.
3D Connexion, "*SpaceMouse Plus: Premium Motion Controller*," www.3Dconnexion.com, 2003., 2 pages.
Gyration, Inc., "*MicroGyro MG1101*," http://www.gyration.com, pp. 1-18, 2005, DEO1300-001, Data Sheet, MicroGyro MG1101, Rev A.
3rdTech, Inc., *HiBallTM—3000 Wide-Area Tracker and 3D Digitizer: 6 DOF Position and Orientation with Unparalleled Precision and Performance, 3rdTech, Inc.*, Chapel Hill, 2 pages.
SmartHome, "*Philips ProntoPro NG Fully Programmable Remote Control #TSU7000*," Printed Sep. 22, 2006, www.smartphone.com/8196.html. pp. 4.
Owens, R., "*Optical Mouse Technology*," pp. 15, Printed on Sep. 22, 2006, www.mstarmetro.net/~rlowens/OpticalMouse/.
Gyration, "*Gyration Home*," pp. 2, printed on Sep. 22, 2006, www.gyration.com/en-US.
Gyration, "*Gyro Technology*," pp. 2, printed on Sep. 22, 2006, www.gyration.com/en-US/GyroTech.html.
Intersense, Inc., "*The New Standard in Motion Tracking*," pp. 2, printed on Sep. 22, 2006, www.intersense.com.
Prentke Romich Company, "*HeadMouse Extreme*," pp. 1, printed on Sep. 22, 2006, http://store.prentrom.com/cgi-bin/store/HE-X.html.
SMARTNAV, "*Assistive Technology—NaturalPoint head tracking for people with special needs*," pp. 6, printed on Sep. 22, 2006, http://rjcooper.com/smartnav/index.html.
3rdTech, Inc., "HiBallTM-3000 Wide-Area Tracker and 3D Digitizer", 2002, 2 pages.
3rdTech, Inc., HiBallTM—3100 Wide-Area, High-Precision Tracker and 3D Digitizer 2003, 3 pges.

Air Mouse Go Plus with MotionSense™, Gyration, 2009, 2 pages.
AirMouse™ Remote Control System Model AM-1 User's Guide, Selectech, Ltd., 1991, 29 pages.
Baca, A., "Spatial Reconstruction of Marker Trajectories from High-Speed Video Image Sequences," Technical Note, Med. Eng. Phys., vol. 19, No. 4, Jun. 1997, pp. 367-74.
Billinghurst, M. & Hirokazu Kato, "Collaborative Augmented Reality", Communications of the ACM, vol. 45, No. 7, pp. 64-70, Jul. 2002.
Billinghurst, M. & Hirokazu Kato, "Real World Teleconferencing", CHI EA'99, 194-194 May 15-20, 1999.
Billinghurst, M. et al., "The MagicBook-Moving Seamlessly between Reality and Virtuality", IEEE Computer Graphics and Applications, vol. 21, No. 3, pp. 6-8, May-Jun. 2001.
Allen, et al., "Tracking: Beyond 15 Minutes of Thought", SIGGRAPH 2001 Course 11, U.N.C. Chapel Hill, ACM, Inc., Aug. 12-17, 2001, pp. 1-117.
Bishop, G. Ph.D.,"Self-Tracker: A Smart Optical Sensor on Silicon", dissertation, U.N.C. Chapel Hill, 1984, 65 pages.
Browse, R., et al., "Controlling Graphic Objects Naturally: Use Your Head," Proceedings of the ISP Conference on the Engineering Reality of Virtual Reality, 1997, 6 pages.
Cameron, A. et al. Proc. SPIE: Helmet- and Head-Mounted Displays and Symbology Design Reqs. II, vol. 2465, 281-95 Helmet Trackers—The Future 1995.
Cantzler, H. et al., "A Novel Form of a Pointing Device," Vision, Video, and Graphics, 2003, pp. 1-6.
Re-examination U.S. Appl. No. 95/002,114, filed Aug. 31, 2012, Part 1, 303 pages.
Re-examination U.S. Appl. No. 95/002,114, filed Aug. 31, 2012, Part 2, 176 pages. (Total 479 pages).
Re-examination U.S. Appl. No. 95/002,116, filed Aug. 31, 2012, Part 1, 302 pages.
Re-examination U.S. Appl. No. 95/002,116, filed Aug. 31, 2012, Part 2, 231 pages. (Total 533 pages).
Re-examination U.S. Appl. No. 95/002,118, filed Aug. 31, 2012, Part 1, 300 pages.
Re-examination U.S. Appl. No. 95/002,118, filed Aug. 31, 2012, Part 2, 242 pages. (Total 542 pages).
Danette, A., et al. "Tracking: Beyond 15 Minutes of Thought", SIGGRAPH 2001 Course 11, U.N.C. Chapel Hill, ACM, Inc., pp. 8/12-17/2001, 117 pages.
Decision of Rejection Office Action from foreign counterpart China Patent Application 200680006415.3 mailed Feb. 17, 2012, 10 pages.
Decision of Rejection Office Action from foreign counterpart Japanese Patent Application JP 2007-551393 mailed Apr. 3, 2012, 2 pages.
DeMenthon, D. (Principal Investigator) National Science Foundation, "Award Abstract #961576:SBIR Phase I: High Performance Three Dimensional Mouse and Head Tracker" 1996, 2 pages.
Dementhon, U.S. Appl. No. 60/591,892, filed Jun. 2, 2009.
Exam Report from foreign counterpart Europe Patent Application 06718289.0 mailed Dec. 10, 2010, 6 pages.
Final Office Action from foreign counterpart Japanese Patent Application JP 2007-551393 mailed Oct. 16, 2012, 2 pages.
Final Office Action from U.S. Appl. No. 11/187,405, mailed Dec. 17, 2009, 18 pages.
Final Office action from U.S. Appl. No. 11/777,078, mailed Jun. 10, 2010, 11 pgs.
Final Office action from U.S. Appl. No. 11/777,078, mailed Sep. 29, 2009, 9 pgs.
Final Office Action from U.S. Appl. No. 11/187,387, mailed Dec. 15, 2008, 24 pages.
Final Office Action from U.S. Appl. No. 11/187,405, mailed Dec. 30, 2008, 30 pages.
Final Office Action from U.S. Appl. No. 11/187,435, mailed Dec. 10, 2009, 19 pages.
Final Office Action from U.S. Appl. No. 11/187,435, mailed Dec. 30, 2008, 17 pages.
Forstner, W., "On the Geometric Precision of Digital Correlation," Proceedings of the ISPRS Symposium *Mathematical Models, Accuracy Aspects and Quality Control*, Finland 1982, International Archives of Photogrammetry, vol. 24, No. 3, 1982, pp. 176-189.

(56) References Cited

OTHER PUBLICATIONS

Foxlin, E. & Leonid Naimark, "VIS-Tracker: A Wearable Vision-Inertial Self-Tracker", IEEE VR2003, Mar. 22-26, 2003, 8 pages.
Foxlin, E. et al., "FlightTracker: A Novel Optical/Inertial Tracker for Cockpit Enhanced Vision ", IEEE/ACM ISMAR 2004, Nov. 2-5, 2004, 1-10 pages.
Gordon, G. et al., "The Use of Dense Stereo Range Data in Augmented Reality", IEEE/ACM ISMAR 2002, 10 pages.
Gottschalk, S. & John Hughes, "Autocalibration for Virtual Environments Tracking Hardware ", SIGGRAPH '93, U.N.C. Chapel Hill, 65-72 1993.
Grunnet-Jepsen, A. et al. "Convolution-kernel-based optimal trade-off filters for optical pattern recognition," Applied Optics, vol. 35, No. 20, Jul. 10, 1996, pp. 3874-3879.
Havelock, D. "Geometric Precision in Noise-Free Digital Images," IEEE Transactions on Pattern Analysis & Machine Intelligence, vol. 11, No. 10, pp. 1065-1075. Oct. 1989.
Havelock, D., "Geometric Precision in Digital Images", Int'l Archives of Photogrammetry & Remote Sensing, vol. XXV, part A3, pp. 381-392, 1984.
Hogue, A., "MARVIN: A Mobile Automatic Realtime Visual and Inertial Tracking System," Technical Report CSE-2003-13, Ph.D. Thesis, York University, Canada, May 15, 2003, 229 pages.
Howard, B. et al., "Lightglove: Wrist-Worn Virtual Typing and Pointing", Lightglove, Inc. Ubiquitous Computing Enabled by Optical Reflectance Controller 2004, Proc. 5th IEEE Int'l Symposium on Wearable Computers (ISWC '01), pp. 172-173, 2001.
International Search Report mailed Sep. 2, 2008, for related International Application No. PCT/US08/05820, filed May 6, 2008, 2 pages.
Jobbagy, A., "Centre Estimation in Marker Based Motion Analysis", Department of Measurement and Instrument Engineering Technical University of Budapest, N. TUB-TR-93-EE04, Budapest, Apr. 15, 1993, Technical Report, Ser. Elec. Eng., 95 pages.
Kato, H. & Mark Billinghurst, "Marker Tracking and HMD Calibration for a Video-based Augmented Reality Conferencing System", Proc. 2nd IEEE/ACM Int'l Workshop on Augmented Reality (IWAR '99), 1999, 10 pages.
Kato, H. et al., "Virtual Object Manipulation on a Table—Top AR Environment", Proc. Int'l Symposium on Augmented Reality (ISAR 2000), pp. 111-119, 2000.
Kato, H. et al., "The Effect of Spatial Cues in Augmented Reality Video Conferencing", Proc. 9th Int'l Conf. on Human-Computer Interaction (HCI Int'l 2001), Aug. 5-10, 2001, 4 pages.
Kim, D. et al., "An Optical Tracker for Augmented Reality and Wearable Computers", Proc. 1997 Virtual Reality Annual Int'l Symposium (VRAIS '97), pp. 146-150, 1997.
Nalwa, V. Addison-Wesley Publishing Co. A Guided Tour of Computer Vision 1993, 372 pages.
NaturalPoint, Inc. TrackIR Software Version 3.10 Manual 2004, 35 pages.
NaturalPoint, Inc. TrackIR Software Version 4.0.020 Manual Jan. 9, 2005 35 pages.
NaturalPoint's TrackiR™, "Reviews and Interviews", 9 pages, 2002 http://www.naturalpoint.com/trackir/02-products/ product-reviews.html.
NaturalPoint's TrackIR2™ "How It Works", 3 pages, 2003, (located at internet archive's wayback machine) http://web.archive.org/web/20040610203639/http://www.naturalpoint.com /.
NaturalPoint's TrackIR™ "3-Pro: Put Your Head In The Game", 2 pages, 2003, (located at internet archive's wayback machine) http://web.archive.org/web/20040619225900/http://www.naturalpoint.com.
Nitzan, D. et al. NSF Grant DAR78-27128 "Machine Intelligence Research Applied to Industrial Automation," Tenth Report, Nov. 1980, 208 pages.
Notice of Allowance for U.S. Appl. No. 11/777,073 mailed Aug. 15, 2013, 55 pages.
Notice of Allowance for U.S. Appl. No. 11/777,078 mailed Jul. 22, 2013, 11 pages.
Notice of Allowance for U.S. Appl. No. 12/115,251 mailed Aug. 16, 2013, 47 pages.
Notice of Allowance from foreign counterpart Japanese Patent Application JP 2007551393 mailed Feb. 26, 2013, 2 pages.
Notice of Allowance from U.S. Appl. No. 11/187,405, mailed Apr. 29, 2010, 16 pgs.
Notice of Allowance from U.S. Appl. No. 11/187,435, mailed May 3, 2010, 13 pgs.
Notice of Allowance from U.S. Appl. No. 11/187,387, mailed Apr. 29, 2010, 14 pages.
Notice of Allowance from U.S. Appl. No. 12/983,554, mailed Apr. 1, 2013, 24 pages.
Notice of Allowance from U.S. Appl. No. 12/983,554, mailed Dec. 20, 2012, 12 pages.
Notice of Allowance from U.S. Appl. No. 12/983,554, mailed Feb. 29, 2012, 18 pages.
Notice of Allowance from U.S. Appl. No. 12/115,251, mailed Feb. 28, 2013, 13 pages.
Notice of Allowance mailed from U.S. Appl. No. 11/187,387, mailed Aug. 23, 2010, 9 pgs.
Notice of Allowance mailed from U.S. Appl. No. 11/187,435, mailed Sep. 2, 2010, 11 pgs.
Office Action for counterpart European Patent Application No. 06718289.9, mailed Nov. 9, 2007, 7 pages.
Office Action for counterpart European Patent Application No. 06718289.9, mailed Dec. 10, 2010, 6 pages.
Office Action from counterpart Japanese Patent Application JP 2007-551393 mailed Jan. 16, 2013, 11 pages.
Office Action from foreign counterpart Europe Patent Application 06718289.0 mailed Jul. 19, 2011, 6 pages.
Office Action from Re-examination U.S. Appl. No. 95/002,114, mailed Oct. 15, 2012, 15 pages.
Office Action from Re-examination U.S. Appl. No. 95/002,116, mailed Oct. 22, 2012, 15 pages.
Office Action from Re-examination U.S. Appl. No. 95/002,118, mailed Oct. 4, 2013, 126 pages.
Office Action from U.S. Appl. No. 11/777,078, mailed Sep. 29, 2009, 9 pages.
Office Action from U.S. Appl. No. 11/777,078 mailed Oct. 10, 2012, 11 pages.
Office Action from U.S. Appl. No. 11/187,387, mailed May 13, 2009, 22 pages.
Office Action from U.S. Appl. No. 11/187,387, mailed Aug. 19, 2008, 24 pages.
Office Action from U.S. Appl. No. 11/187,405, mailed May 13, 2009, 18 pages.
Office Action from U.S. Appl. No. 11/187,405, mailed Aug. 20, 2008, 33 pages.
Office Action from U.S. Appl. No. 11/187,435, mailed May 11, 2009, 15 pages.
Office Action from U.S. Appl. No. 11/187,435, mailed Aug. 20, 2008, 25 pages.
Office Action from U.S. Appl. No. 11/777,078 mailed Nov. 22, 2011, 17 pages.
Office Action from U.S. Appl. No. 12/983,554, mailed Feb. 23, 2011, 54 pages.
O'Gorman, L. et al., "A Comparison of Fiducial Shapes for Machine Vision Registration", IAPR Workshop on Machine Vision Applications (MVA '90), pp. 253-256, Nov. 28-30, 1990.
PCT Application No. PCTUS2006001198 International Search Report and Written Opinion of the International Searching Authority, mailed Jul. 17, 2007, 11 pages.
PCT Application No. PCTUS2006001198 International Search Report and Written Opinion of the International Searching Authority, mailed Oct. 30, 2006, 14 pages.
Rose, E. et al., "Annotating Real-World Objects Using Augmented Reality," Technical Report ECRC-94-41, 21 pages (also published in CG International '95 Proceedings, Leeds, UK, Jun. 1995, pp. 357-370).
Savvides, M. et al., "Face Verification using Correlation Filters", Proc. 3rd IEEE Workshop. On Automatic Identification Advanced Technologies, pp. 56-61, Mar. 2002.

(56) References Cited

OTHER PUBLICATIONS

Selectech, Ltd.'s AirMouse™ Remote Control System ("AirMouse").

Smith, S., "The Scientist and Engineer's Guide to Digital Signal Processing," California Technical Publishing, 1997, 643 pages. Submitted by pp. 01-199; 200-350; 351-475; and 476-626.

Smith, S., "The Scientist and Engineer's Guide to Digital Signal Processing," California Technical Publishing 1st Edition, 1997, pp. 503-534.

Solymar, L. et al. Oxford Series in Optical and Imaging Sciences, Clarendon Press "The Physics and Applications of Photorefractive Materials," 1996, 3 pages.

Stern, A. et al., "Shannon number and information capacity of three-dimensional integral imaging", J. Opt. Soc. Am. A, vol. 21, No. 9, pp. 1602-1612, Sep. 2004.

Summons from counterpart European Patent Application No. 06718289.9, mailed Dec. 4, 2012, 8 pages.

Tew, A. Med. & Biol. Eng. & Comput., vol. 26, 68-74 The Oxford Optical Pointer: a direction-sensing device with proportional electrical output Jan. 1988.

ThinkOptics, Inc.v. Nintendo of America et al., "Defendant Nyko Technologies. Inc. and Intec. Inc. Invalidity Contentions Exhibit A," Civ. Action No. 6:11-cv-0045S-LED, US. Dist. Ct of Tx., Eastern Dist. Filed Aug. 14, 2012, 78 pages.

ThinkOptics, Inc.v. Nintendo of America et al., "Invalidity Contentions Pursuant to P.R. 3-3 and 3-4 of Defendants Nintendo of America Inc. and Nintendo Co. Ltd. Exhibit C," Civ. Action No. 6:11-cv-00455-LED, US. Dist. Ct of Tx., Eastern Dist. Filed Aug. 14, 2012, 521 pp.

ThinkOptics, Inc v. Nintendo of America et al., "Imation Corp's 3-3 and 3-4 Disclosures" Civ. Action No. 6:11-cv-00455-LED, US. Dist. Ct of Tx, Eastern Dist. Filed Aug. 14, 2012, 56 pp.

ThinkOptics, Inc v. Nintendo of America et al., "Defendant Nyko Technologies, Inc. and Intec, Inc. Invalidity Contentions Exhibit D," Civ. Action No. 6:11-cv-00455-LED, US. Dist. Ct of Tx., Eastern Dist. Filed Aug. 14, 2012, 3 pages.

ThinkOptics, Inc v. Nintendo of America et al., "Defendant Nyko Technologies. Inc. and Intec. Inc. Invalidity Contentions Exhibit B," Civ. Action No. 6:11-cv-00455-LED, US. Dist. Ct of Tx., Eastern Dist. Filed Aug. 14, 2012, 55 pages.

ThinkOptics, Inc v. Nintendo of America et al., "Imation Corp's 3-3 and 3-4 Disclosures," Exhibit A. Civ. Action No. 6:11-cv-00455-LED, US. Dist. Ct of Tx., Eastern Dist. Filed Aug. 12, 2012, 116 pp.

ThinkOptics, Inc v. Nintendo of America et al., "Invalidity Contentions Pursuant to P.R. 3-3 and 3-4 of Defendants Nintendo of America Inc. and Nintendo Co. Ltd. Exhibit A.," Civ. Action No. 6:11-cv 00455-LED, US. Dist. Ct. of Tx., Eastern Dist. Filed Aug. 14, 2012, 583 pp.

ThinkOptics, Inc v. Nintendo of America et al., "Invalidity Contentions Pursuant to P.R. 3-3 and 3-4 of Defendants Nintendo of America Inc. and Nintendo Co. Ltd. Exhibit B.," Civ. Action No. 6:11-cv-00455-LED, US. Dist. Ct. of Tx., Eastern Dist. Filed Aug. 14, 2012, 367 pp.

ThinkOptics, Inc. v. Nintendo of America et al., "Defendant Nyko Technologies. Inc. and Intec. Inc, Invalidity Contentions Exhibit C," Civ. Action No. 6:11-cv-00455-LED, US. Dist. Ct of Tx., Eastern Dist., Filed Aug. 14, 2012, 64 pages.

ThinkOptics, Inc. v. Nintendo of America et al., "Invalidity Contentions Pursuant to P.R. 3-3 and 3-4 of Defendants Nintendo of America Inc. and Nintendo Co. Ltd." Civ. Action No. 6:11-cv-00455-LED, US. Dist. Ct of Tx. Eastern Dist. Filed Aug. 14, 2012 393 pp.

ThinkOptics, Inc. v. Nintendo of America et al., "Defendant Nyko Technologies. Inc. and Intec. Inc. Invalidity Contentions," Civ. Action No. 6:11-cv-00455-LED, US. Dist. Ct of Tx., Eastern Dist. Filed Aug. 14, 2012, 9 pages.

Tian, Q., et al., "Algorithms for Subpixel Registration", Computer Vision, Graphics, and Image Processing, vol. 35, pp. 220-233, 1986.

Tjan, B. et al., "Digital Sign System for Indoor Wayfinding for the Visually Impaired", 2005 IEEE Computer Science Conf. on Computer Vision and Pattern Recognition (CVPRW'05), 8 pgs. Jun. 20-26, 2005.

Van de Valde, G., et al., "Inventory of Embedded Systems for Image Processing," Version 1.3, HOBU-fund research project 030106, De Nayer Instituut, Oct. 8, 2004, 39 pages.

Van de Velde, G., et al., "Sub-Pixel Edge Detection," Version: 1.2, HOBU-fund research project 030106, De Nayer Instituut, Oct. 2004, 7 pages.

Veligdan, J., "Unique Interactive Projection Display Screen", BNL-64780, U.S. Air Force P.R.A.M. office and by D.A.R.P.A, pp. 9.

Welch, G., et al., "Motion Tracking: No Silver Bullet, but a Respectable Arsenal," IEEE computer Graphics and Applications, vol. 22, No. 6, Nov.-Dec. 2002, pp. 24-38.

Welch, G., et al., "SCAAT: Incremental Tracking with Incomplete Information," re-published as appended paper to SIGGRAPH 2001, Course 11, ACM, Inc., Aug. 12-17, 2001, 12 pages.

Welch, G. et al. "The HiBall Tracker: High-Performance Wide-Area Tracking for Virtual and Augmented Environments", Proc. ACM Symposium on Virtual Reality Software & Technology Dec. 20-22, 1999, pp. 1-11.

Welch, G. et al., "High-Performance Wide-Area Optical Tracking—The HiBall Tracking System", SIGGRAPH 2001, Course 11, Feb. 2001, pp. 1-22.

Wilson, A, et al., " Demonstration of the XWand Interface for Intelligent Spaces," UIST '02 companion, 2002. pp. 37-38.

Wilson, A. & Steven Shafer, "XWand: UI for Intelligent Spaces", Proc. SIGCHI Conf. on Human factors in computing systems (CHI '03), pp. 545-552, Apr. 5-10, 2003.

Wilson, A., "Wireless User Interface Devices for Connected Intelligent Environments", Ubicomp Workshop on Multi-Device Interfaces for Ubiquitous Peripheral Interaction , 2003, 3 pages.

Wilson, D. et al., "Gesture Recognition Using the XWand", Tech. Report CMU-RI-TR-04- 57, Robotics Institute, Carnegie Mellon University, Apr. 2004, 10 pages.

Woods, E. et al. Proc. 1st Inl'l Conf. on Computer Graphics and Interactive Techniques, MagicMouse: an Inexpensive 6-Degree-of-Freedom Mouse, pp. 285-286, 2003.

Wormell, D. & Eric Foxlin, "Advancements in 3D Interactive Devices for Virtual Environments," Proc. Workshop on Virtual Environments (EGVE '03), May 22-23, 2003, pp. 47-56.

Zuech, N., "Smart Vision Sensors, Consultancy", AIA Vision Online Sep. 3, 2003, 10 pages.

Naimark, L., et al., "Encoded LED System for Optical Trackers," Proceedings of the 4th IEEE/ACM Int'l Symposium on Mixed and Augmented Reality, Oct. 5-8, 2005, pp. 1-4.

Vicci, L., "Quaternions and Rotations in 3-Space: the Algebra and Its Geometric Interpretation," Technical Report TR01-014, UNC Chapel Hill, Department of Computer Science, pp. 1-11, republished as appended paper to SIGGRAPH 2001, Course 11, ACM, Inc., Aug. 12-17, 2001.

Response to Office Action from Foreign Counterpart China Patent Application No. 200680006415.3, dated Dec. 2009, 27 pages.

Response to Second Office Action from Foreign Counterpart China Patent Application No. 200680006415.3, dated Feb. 2011, 33 pages.

Response to Third Office Action from Foreign Counterpart China Patent Application No. 200680006415.3, dated Oct. 2011, 21 pages.

Response to Decision of Rejection Office Action from Foreign Counterpart China Patent Application No. 200680006415.3, mailed Jun. 2012, 28 pages.

International Preliminary Report on Patentability and Written Opinion of the International Searching Authority mailed Jan. 30, 2008, for International Patent Application No. PCT/US07/15955, 9 pages.

Response to Office Action for counterpart European Patent Application No. 06718289.9 mailed Nov. 9, 2007, dated May 9, 2008, 25 pages.

Response to Office Action for counterpart European Patent Application No. 06718289.9 mailed Sep. 7, 2009, dated Mar. 17, 2010, 27 pages.

Response to Examiners Report from Foreign counterpart European Patent Application No. 06718289.9, mailed Dec. 10, 2010, dated Jun. 8, 2011, 29 pages.

(56) References Cited

OTHER PUBLICATIONS

Response to Office Action for counterpart European Patent Application No. 06718289.9 dated Jan. 5, 2012, 30 pages.
Response to Summons to Attend Oral Proceedings for counterpart European Patent Application No. 06718289.9 mailed Dec. 4, 2012, filed Jan. 18, 2013, 25 pages.
Petition for Appeal to Office Action from foreign Counterpart Japanese Patent Application JP 2007-551393, filed Aug. 1, 2012, 32 pages.
Office Action from foreign Counterpart Japanese Patent Application Jp 2007-551393 mailed Oct. 16, 2012, 2 pages.
Amendment to Office Action from foreign Counterpart Japanese Patent Application JP 2007-551393, filed Nov. 20, 2012, 17 pages.
PCT International Search Report and Written Opinion of the International Searching Authority from PCT Patent Application No. PCT/US2006/001198, mailed Oct. 30, 2006, 14 pages.
PCT International Search Report and Written Opinion of the International Searching Authority from PCT Patent Application No. PCT/US2006/001198 mailed Jul. 17, 2007, 11 pages.
Final Office Action from U.S. Appl. No. 11/187,405, mailed Aug. 20, 2008, 42 pages.
Final Office Action from U.S. Appl. No. 11/777,078, mailed Oct. 10, 2012, 11 pages.
Robinette, W. et al., "The Visual Display Transformation for Virtual Reality," TR94-031, Sep. 1994, pp. 1-30, re-published as appended paper to SIGGRAPH 2001, Course 11, ACM, Inc., Aug. 12-17, 2001.
Yang, H., et al., "Illumination Insensitive Model-Based 3D Object Tracking and Texture Refinement," Proceedings of the 3rd Int'l Symposium on 3D Data Processing, Visualization, & Transmission, 2006, 8 pages.
Office Action from foreign counterpart Chinese Patent Application No. 200680006415.3 mailed Nov. 20, 2013, 5 pages. (no English Translation).
Final Office Action from U.S. Appl. No. 11/777,078, mailed May 2, 2014, 11 pages.
Office Action from Re-examination U.S. Appl. No. 95/002,118 mailed Nov. 9, 2012, 13 pages.
Office Action from U.S. Appl. No. 11/187,387 mailed May 13, 2009, 22 pages.
Notice of Allowance from U.S. Appl. No. 12/983,554 mailed Mar. 19, 2014, 15 pages.
Final Office Action from U.S. Appl. No. 12/983,554 mailed Jul. 26, 2011, 16 pages.
Notice of Allowance from U.S. Appl. No. 12/983,554 mailed Nov. 14, 2011, 13 pages.
Notice of Allowance from U.S. Appl. No. 12/983,554 mailed Jun. 11, 2012, 11 pages.
Notice of Allowance from U.S. Appl. No. 12/983,554 mailed Dec. 5, 2013, 26 pages.
Random House Webster's College Dictionary, see p. 273 (Random House, 2d ed. 2000), 3 pages, ISBN 0-375-42560-8 or ISBN 0-375-42561-6 (Deluxe Edition).
Hobbs, Phillip, C.D., "Building Electro-Optical Systems Making It All Work", Second Edition, Wiley, A John Wiley & Sons, Inc., Publication, copyright page, see p. 29, 2009, ISBN 978-0-470-40229-0, 3 pages.

* cited by examiner

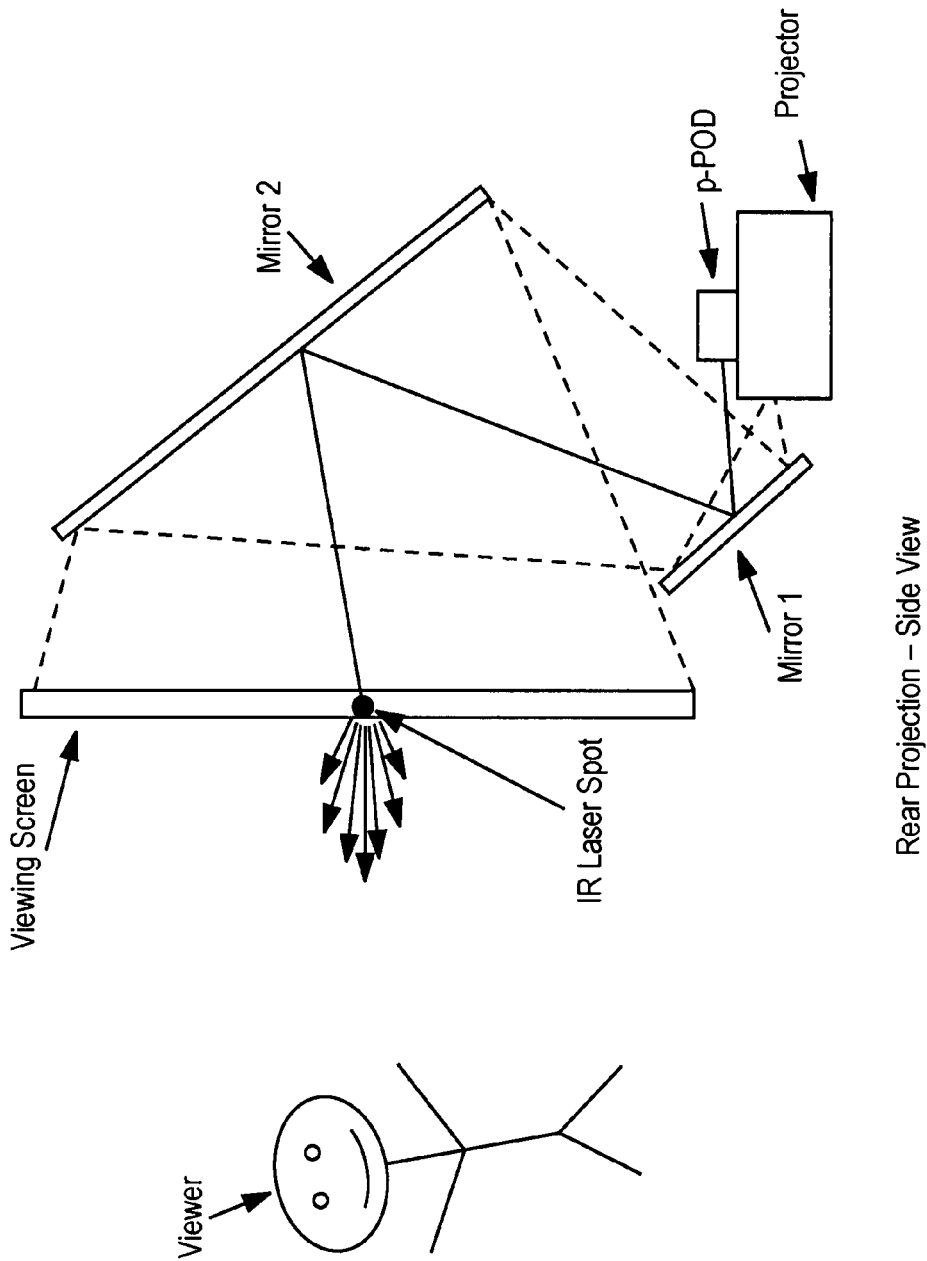

FREE-SPACE MULTI-DIMENSIONAL ABSOLUTE POINTER USING A PROJECTION MARKER SYSTEM

RELATED APPLICATIONS

This application claims the benefit of U.S. Provisional Application No. 60/831,735, filed Jul. 17, 2006, which is incorporated by reference herein in its entirety.

FIELD OF THE INVENTION

The present invention relates generally to a data processing system. More particularly, this invention relates to free-space multi-dimensional absolute pointer using a projection marker system.

BACKGROUND

Among the several handheld devices that exist for remotely controlling electronic equipment, the free-space multi-dimensional absolute pointer (as described in the above-incorporated applications) stands to bring the ease of use by unifying control of nearly all devices under one simple operational paradigm, point-twist-zoom. In a similar way that the mouse and the graphical user interface brought the simplicity and user-friendliness to the PC (personal computer) platform in the early 1970's with its "point-and-click" paradigm, the world of the digital living room is now experiencing a rapid convergence of electronic equipment and technologies that are overwhelming the control capabilities of traditional interfaces, such as universal IR remote controls, mice, and keyboards.

This is becoming even more evident with several key consumer trends: 1) strong sales of large screen digital TVs, 2) strong demand for digital video recording functionality (e.g., TiVo) and advanced TV viewing, 3) pervasive entrenchment of the internet in all aspects of human life (e.g., information search, travel, purchase/sales, banking, etc.), 4) nearly complete conversion to digital cameras and camcorders in the USA, and 5) increased demand for gaming for recreational purposes (e.g., on-line games, casual games, multi-player games, etc.). When these trends collide in the digital living room, the user needs a simple device and user paradigm to be able to manage and navigate this flood of content.

SUMMARY OF THE DESCRIPTION

Methods and apparatuses for free-space multi-dimensional absolute pointer using a projection marker system are described herein. In one embodiment, a presentation system includes, but is not limited to, a projection-based marker apparatus to project one or more optical spots on a display surface for displaying machine generated content capable of being manipulated via a cursor of a pointing device, a handheld device to wirelessly capture the projected optical spots from the display surface, and a control unit communicatively coupled to the projection-based marker apparatus and the handheld device to determine coordinates of the cursor based on characteristics of the captured light spots.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 7A and 7B are block diagrams illustrating a presentation system according to certain alternative embodiments.

DETAILED DESCRIPTION

Methods and apparatuses for a free-space multi-dimensional absolute pointer using a projection marker system are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a free-space absolute pointer, henceforth referred to as the WavIt, provides such a tool by combining simple 3D pointing with a graphical user interface on a large screen monitor/TV. The WavIt is an absolute pointer, where a user points is where the cursor goes. It works on any type of screen (e.g., CRT, DLP, RPTV, LCD, Plasma etc). The WavIt also tracks other degrees of freedom, such as the absolute angle of rotation of the user's wrist, and the user's absolute distance away from the screen. Some versions also track the user's location in the room. All this takes place in real time, and multiple users can use devices at the same time, which is of particular interest for multi-player gaming.

An embodiment of the invention is to expand on ways in which the WavIt absolute pointing system may be engineered to work with large front- (and/or rear-) projection screens. Specifically, the techniques described throughout this application focus on how a projection-POD (Photonic Origin Designator) or p-POD may be developed to allow easy usability and setup, primarily for conference room settings.

The WavIt multi-dimensional pointer is a high precision tracking system in which the core miniature sensing unit resides inside a handheld remote control device. The device tracks multiple degrees of freedom in absolute space, meaning that not only does it sense where the user is pointing, but it also senses whether the user is twisting his wrist, leaning forward, or sitting to the side of the room. Functionally, it basically acts like a localized GPS (global positioning system) device to track where you are with respect to the TV screen as well a laser-pointer to detect where you are pointing, and a tilt sensor to know how much your wrist is twisted. These functions that typically require several distinct sensing and pointing technologies are achieved using the same underlying optical tracking that is core to the WavIt system.

Figure 1:
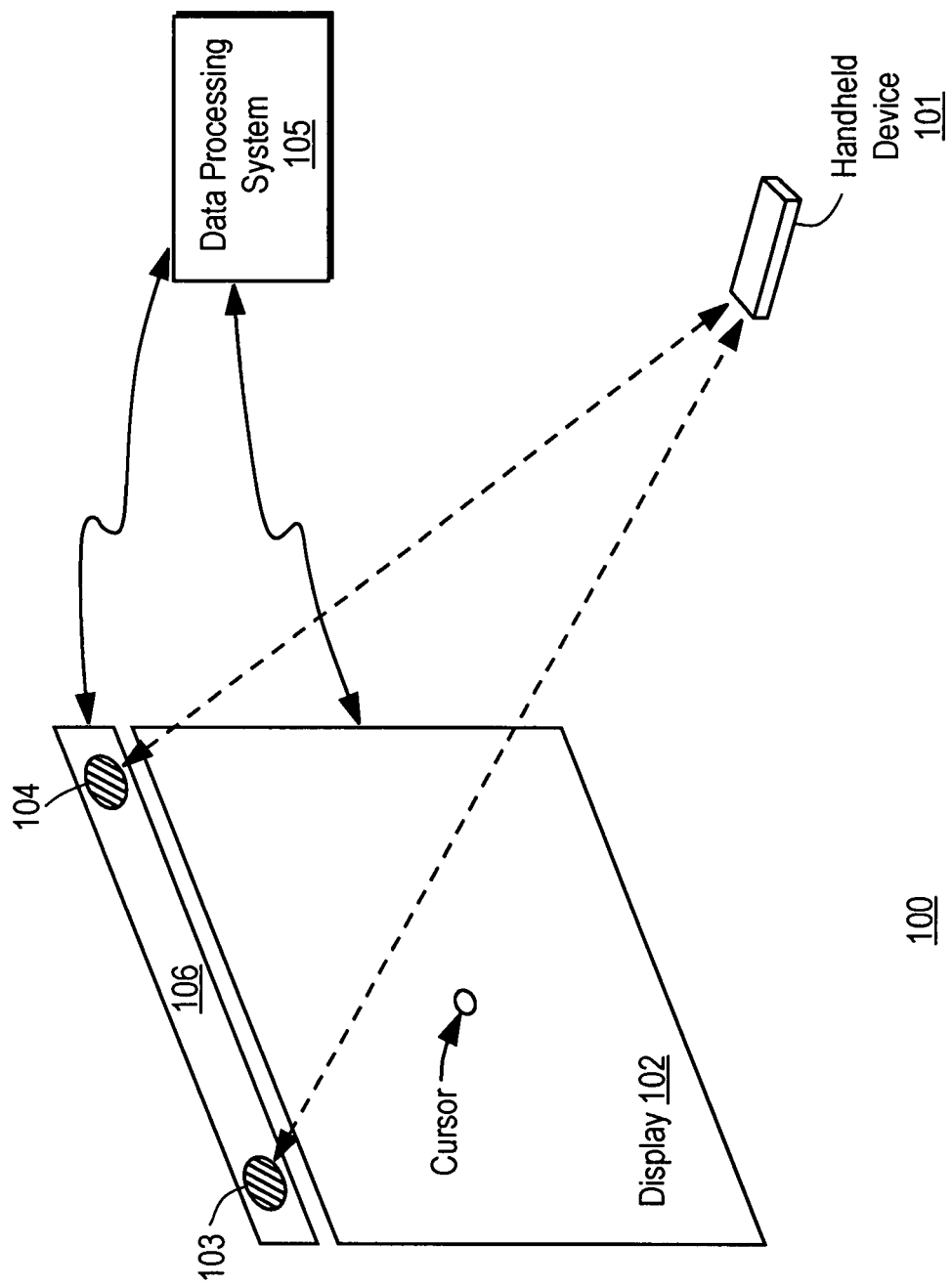
FIG. 1 is a block diagram illustrating major components of a system which may be used with one embodiment of the invention.

FIG. 1 is a block diagram illustrating an exemplary system configuration according to one embodiment of the invention. Referring to FIG. 1, system 100 includes a handheld device 101, a display surface 102, one or more emitters 103-104, and a data processing system 105. In one embodiment, the handheld device 101, hereafter referred to as the Handset, may be used by an end user as a pointing device. This device incorporates an optical sensing unit (such as a CMOS camera) that tracks the Optical Beacons transmitted from a photonic origin designator (POD) 106 (having emitters 103-104) and calculates its own multi-dimensional coordinates. The Handset 101 then sends various data (including coordinates) to the POD 106 using one of several wireless technologies. The handset can also receive RF commands from the POD 106.

A receiving device 106, hereafter referred to as the POD, receives the data from the Handset using a variety of wireless communication protocols, such as, for example IR, Bluetooth, or IEEE 802.xx protocols. This device is coupled to a computer via a communication link such as a USB connection. The receiver channels the data from the Handset into a data processing system 105. The receiver also has the ability to "blast" IR signals to all other Infrared sensitive devices within a predetermined proximity such as a room. A subsection of the POD is dedicated to generating the Optical Beacons, which serve as the optical markers that are tracked by the handset.

A host computer 105 (or set-top box) receives the data from the POD. This is handled by a driver, which communicates with the Handset using the USB device. A driver will, based on the data sent, calculate position and pointing coordinates and read the button presses and use this information to control the PC and specific programs or environments.

All interaction happens via a display surface such as a TV screen. This is the screen on which the content, e.g., movies or internet pages, will be displayed. It is also where additional graphical overlays may appear as dictated by a specific user interface.

The WavIt multidimensional tracker is based on optical tracking of one or more spots, or marker images on an optical sensor. In one embodiment, an optical sensor is incorporated into a handset. This arrangement is one of the key aspects of WavIt system from which many of its highly desirable features are derived. By incorporating specific optical wavelength filtering in the sensor, according to one embodiment, the sensor can be made to only see or detect a light of a specific wavelength range, such as, for example, ranging approximately from 900 to 1000 nm.

Figure 3A:
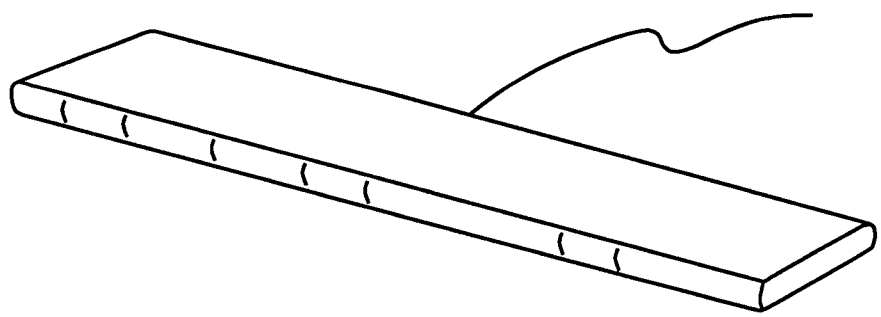
FIGS. 3A-3C are diagrams illustrating certain configurations of major components of a system according to one embodiment of the invention.
Figure 3B:
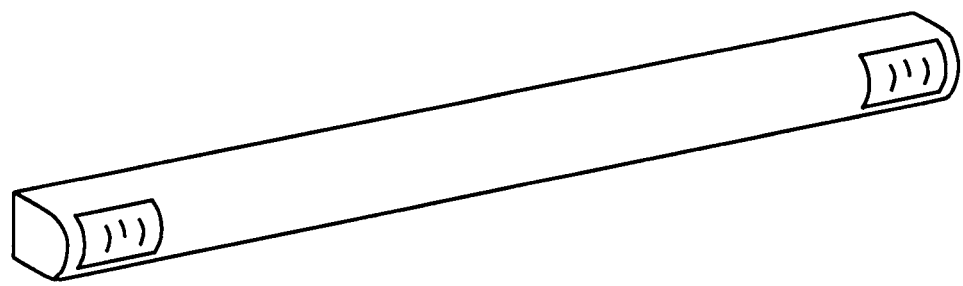
Figure 3C:
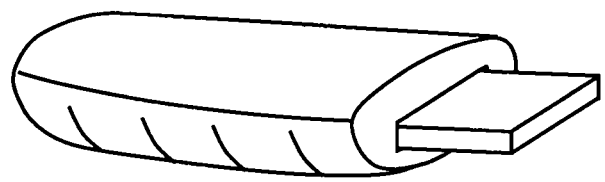

There are a number of ways to generate the optical beacons or markers. In one embodiment, one or more IR LEDs may be incorporated into a POD unit that is placed near the screen, with the IR LEDs emitting into the room, towards the handset. However, it is not so limited. Different embodiments of a POD and/or beacons may be incorporated with one or more IR LEDs that emit into the room. For example, the beacons may be built into the RF receiver and/or USB chip enclosure. Alternatively, the RF receiver may only contain the beacons, and RF reception is handled separately by a separate USB dongle unit with RF receiver. FIGS. 3A-3C illustrate certain configurations of devices according to certain embodiments. Other configurations may exist.

Figure 2A:
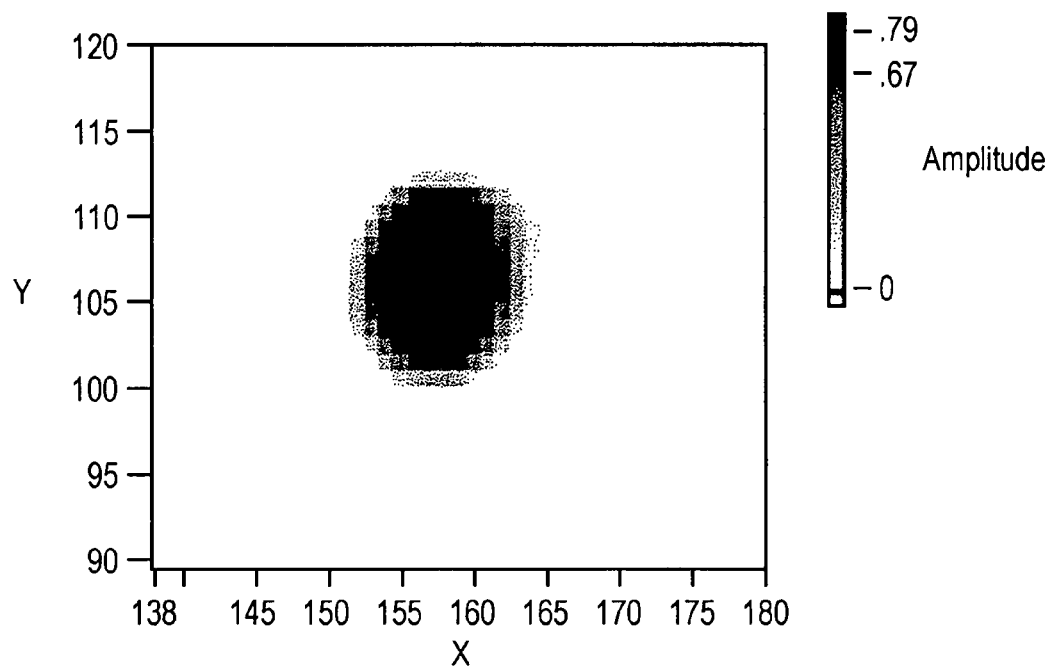
FIGS. 2A and 2B are diagrams illustrating certain light spots according to certain embodiments of the invention.

With IR LEDs placed in the POD, according to certain embodiments, these light sources may be seen or detected by the handset as distinct spots. A single spot, as seen by the handset's image sensor and microcontroller, is shown in FIG. 2A according to one embodiment. In this example as shown in FIG. 2A, the image is approximately 13×14 pixels in size.

Figure 2B:
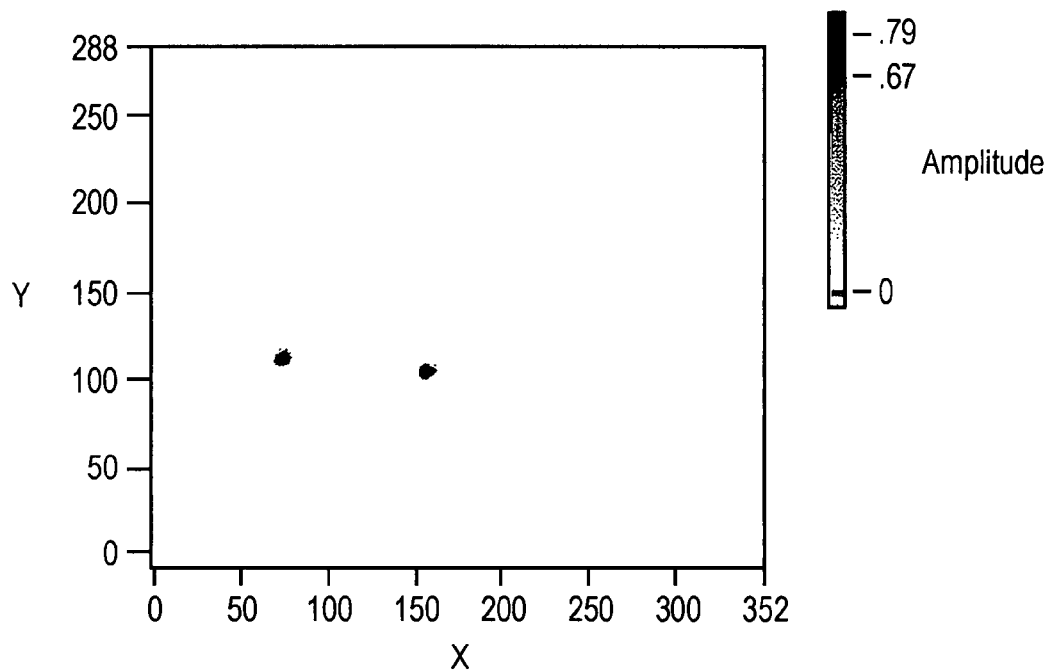

It will be appreciated that multiple spots may also be implemented. For example, as shown in FIG. 2B, a set of, say, two spots are processed in the handset unit for their pixel coordinates on the sensor and their signal strengths. This information is subsequently sent to the POD receiver which in turn transmits this data to a computer. In this example as shown in FIG. 2B, the coordinates are sent by a Zigbee RF 2.4 GHz wireless chip. Note that in this example, the array size is approximately 352×288; however, fractional coordinates exist (e.g., a spot can have a location of 251.23, 122.57). The resolution is such that it can effectively have approximately 35200 by 28800 pixels. Other camera resolutions can of course be employed. Certain detailed operations of the system are described in the co-pending U.S. patent application Ser. Nos. 11/187,435; 11/187,405; and 11/187,387, filed Jul. 21, 2005, where the disclosure of which is incorporated by reference herein in its entirety.

There are situations in which placing a physical POD near a screen is either not very feasible or undesirable. This may be the case, for example, in a conference room scenario. Here the user would need to find a way to mount the POD near a screen and would then have a long USB cable extending back to the user's PC in order to make his system operational. Without prior knowledge of the room and/or time to set up before a meeting, this may be a risky undertaking.

One option is to have a 3-piece system, as shown in FIGS. 3B and 3C, in which the Handset, the RF receiver/USB dongle, and beacons are separate devices. The beacon can now be more portable and adaptable to mounting, such as the spring-loaded battery powered version shown in FIG. 3B. The portable beacons could also have an RF sensor to listen for RF communication and shut down to conserve power if no RF signals are sensed. Alternatively, it could be required that all conference rooms be equipped with an inexpensive set of beacons that are permanently mounted on the wall.

Figure 4A:
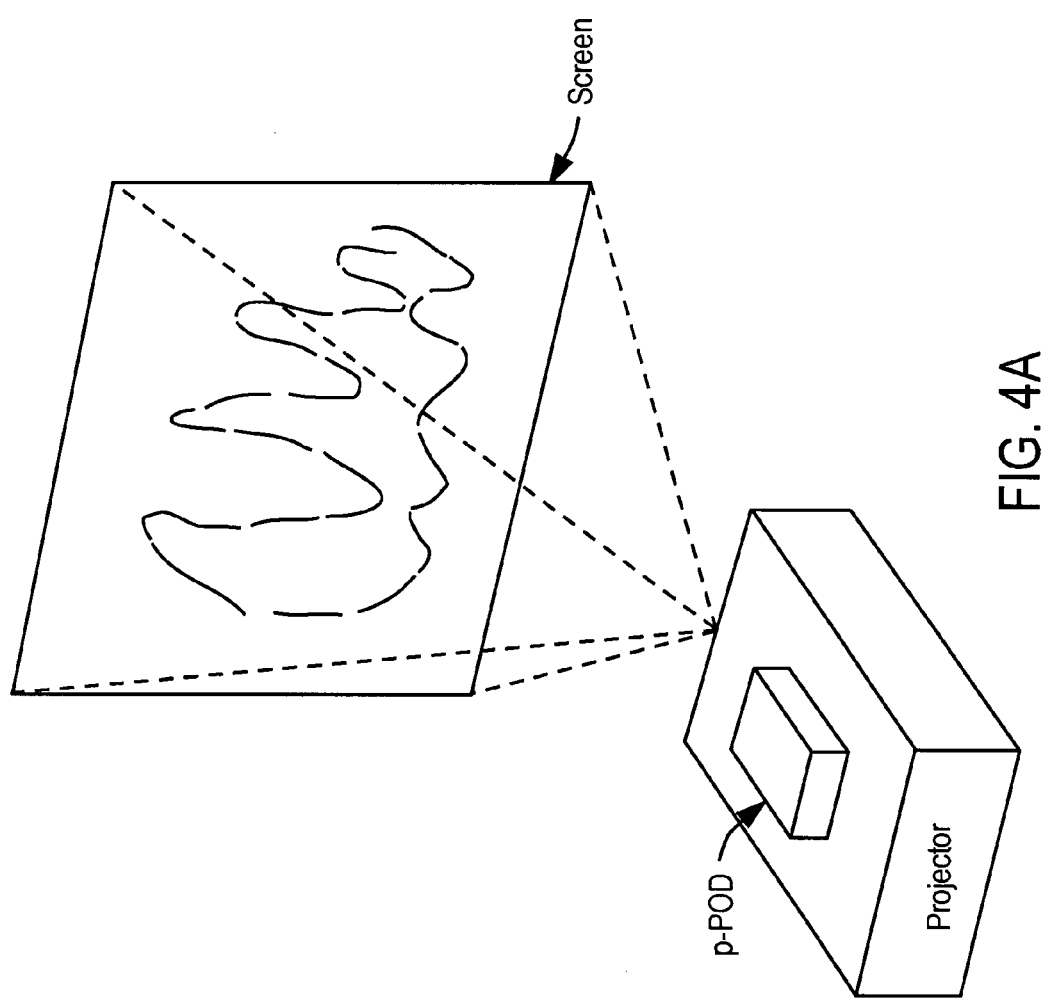
FIGS. 4A-4C are block diagrams illustrating an operating environment according to one embodiment of the invention.
Figure 4B:
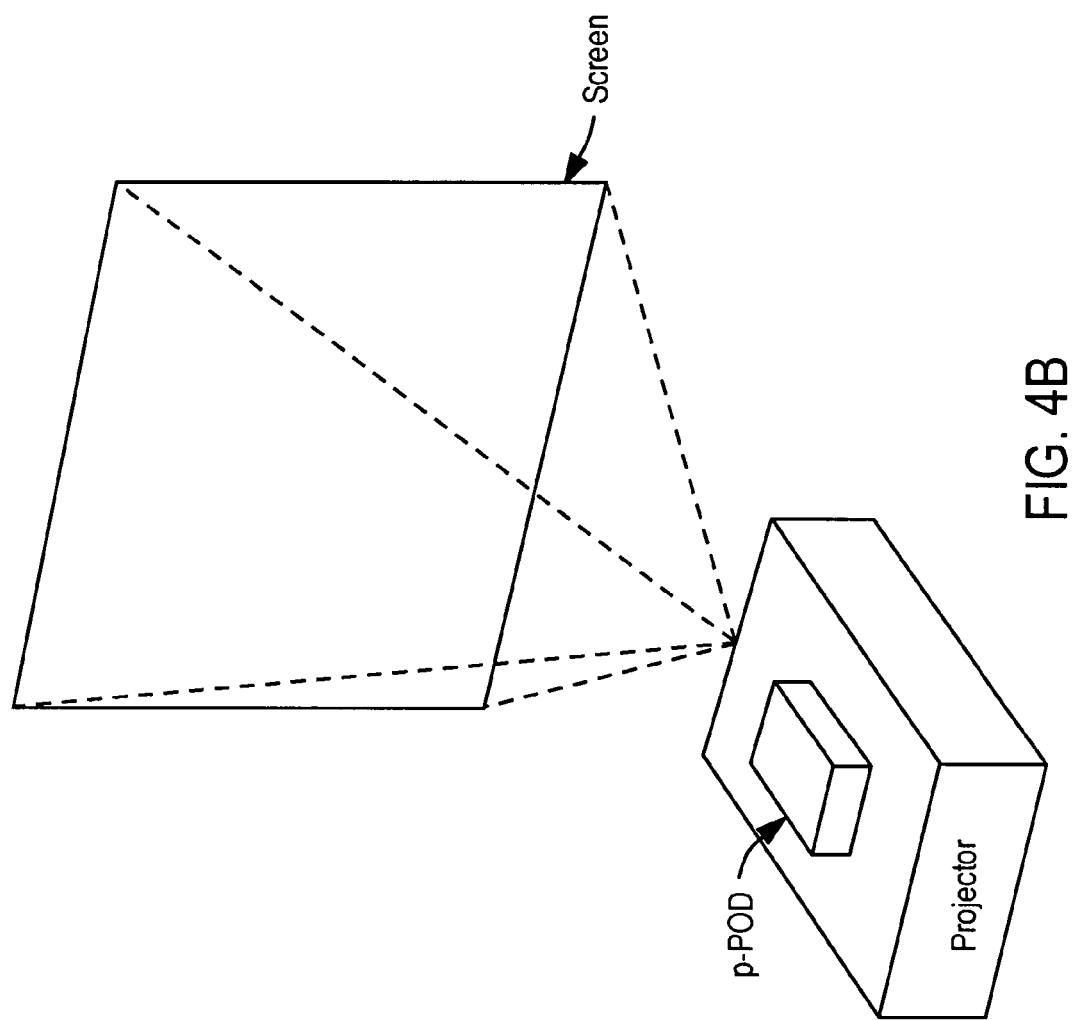
Figure 4C:
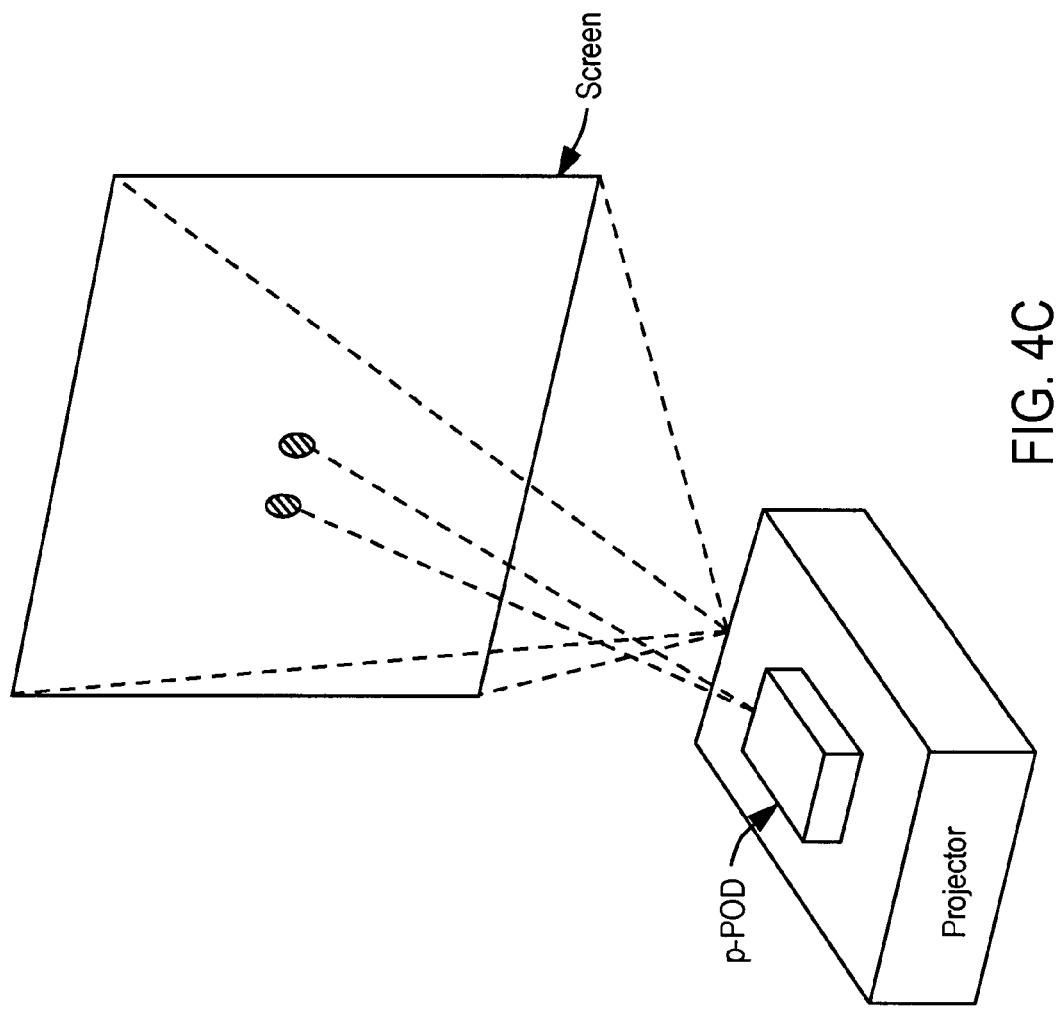

In one embodiment, that obviates the need for the beacons to be mounted or attached to a wall or screen, a virtual POD is created inside the screen. FIGS. 4A-4C are block diagrams illustrating an operating environment according to one embodiment of the invention. FIG. 4A illustrates a standard projection (front or rear) system. FIG. 4B illustrates the same system as detected by the sensor in the handset. Because of the optical filtering in the handset, which blocks substantially all visible light, the screen is essentially blank. FIG. 4C illustrates the system when the IR sources (e.g., lasers) in the projection apparatus are turned on. In this embodiment, two spots, generated by the projected light scattered by the display screen, are detected by the handset's sensor but are invisible to the human eye. In this example, FIGS. 4A-4C show a configuration where all elements of the POD (the RF receiver, the beacons, and the USB PC communication) are co-located in a single unit placed on top of the projector, and where the POD projects the two IR spots onto a screen, for example, into the middle of the screen used by the front (or rear) projector. In one embodiment the projection beacons originate from inside the projector (e.g., they are built into the projector system).

In one embodiment, the two spots are generated by two collimated 980 nm IR lasers, pointing out of the projection-POD at a slightly diverging angle. It should be noted that it is also possible to project light from IR LEDs onto the screen, according to another embodiment, but that care must then be taken to refocus (re-image) the spots whenever the projection-POD is moved so that its distance from the screen changes appreciably. In order to have minimal system dependence (e.g., signal strength and spot size) on the POD location, it is useful to use collimated light sources, and for this reason, lasers are an ideal source. The IR spots could originate from individual sources or from a single source that is optically split into multiple beams.

The handset will now see two spots when pointing in the vicinity of the screen, in a similar way as if a POD had been mounted in the middle of the projection screen. The projection-POD has the benefit of not requiring cables extending from the screen to the PC. The setup procedure is also relatively simple—simply point the p-POD at the screen. In one embodiment, one or more guiding visible lasers are used to facilitate placement of the invisible IR spots onto the screen.

Figure 5:
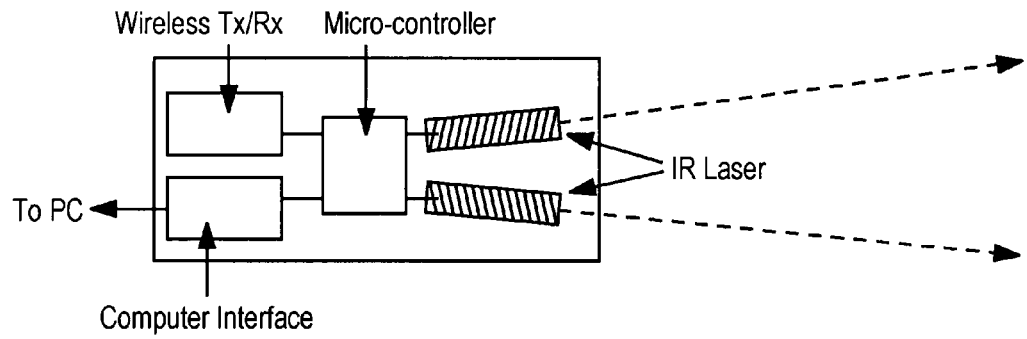
FIG. 5 is a block diagram illustrating a presentation system according to one embodiment.

The functional components of a p-POD in which the light source and receiver electronics are integrated into a single unit are shown in FIG. 5, according to one embodiment. In addition to the one or more IR lasers, according to one embodiment, the following components may be included: a wireless radio device (e.g., Chipcon/TI, CC2420 2.4 GHz radio IC) for receiving and transmitting data from/to the Handset, a micro-controller (e.g., Maxim, MaxQ2000) that controls the data flow between the Handset and computer as well as the switching of the power to the IR lasers, and a computer interface device (e.g., Silicon Labs, CP2102 USB-UART IC).

Figure 6:
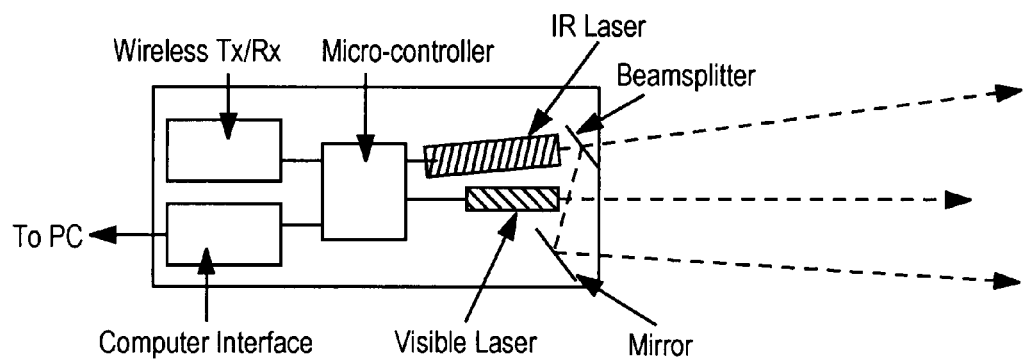
FIG. 6 is a block diagram illustrating a presentation system according to an alternative embodiment.

Note that some or all of these functions (wireless Rx/Tx, micro-control, and computer interface) may be integrated into one or two chips. For example, the Chipcon/TI CC2430 combines the wireless radio and micro-controller functions. Not shown in FIG. 6 are other standard components, such as power supply and management circuitry (batteries or voltage regulators), switching and control devices (e.g., mechanical switches), and indicators such as LEDs showing on/off state. A particular configuration would use the USB computer interface to supply the electrical power for the p-POD, although separate power supplies or batteries may be desirable in some situations (e.g., if the current capacity of the USB interface is exceeded or if remote operation is required). An example of the latter case would be where the lasers are housed separately from the remaining components in the p-POD and the projector is physically separated from the computer. In this case, it may be desirable to power the laser portion using batteries.

Referring to FIG. 5, according to one embodiment, the lasers are mounted such that their emitted beams exit the p-POD at an angle with respect to each other. The specific angle between the beams is not critical, but the optimal range of angles is determined by the range of distances between the POD/projector and the screen and the desired spot separation on the screen. If the separation is too small, then the accuracy in the distance and rotation sensing of the system is reduced, and if the separation is too large, then the angular pointing range of the Handset is reduced since both spots must be within the vision system's field of view.

For example, for typical operating distances of 2 to 5 meters from a screen with a 50 inch diagonal, a projected spot separation of approximately 15 to 25 cm is a relatively good compromise for a vision system with a 50 degree field of view. If the p-POD is placed approximately 2 to 3 meters from the screen, where a typical front projector would be located, then the optimal angle between the IR beams would be approximately 3 to 7 degrees. For other operating conditions and system characteristics, different optimal beam angles will result. In some configurations, this angle is fixed, and in other configurations, the angle is made to be adjustable.

FIG. 6 shows an alternative embodiment in which a single IR laser is used to generate the two beams, and a visible alignment laser is incorporated to aid in the placement of the p-POD. Lasers that may be used for this purpose are those used in commercially available laser pointers (e.g., red diode lasers). These are typically low power (<5 mW) and inexpensive devices (<$1). In one embodiment, the alignment laser would be turned on during initial set up of the p-POD and pointing system, and the guide laser would be pointed at, or near, the middle of the screen.

In a particular embodiment, the visible guide laser beam bisects the two IR beams so that when it is pointed at the middle of the screen, it is known that the invisible IR spots are symmetrically located around the middle of the screen. During subsequent operation of the system, the visible guide laser may be turned off and used only when the p-POD alignment needs to be verified. The guide laser may be controlled by the micro-controller or by other means, such as an electromechanical switch. The two IR beams are generated from a single laser device using optical beamsplitters and mirrors, both standard optical components. In one embodiment, the beamsplitter divides the incident IR light from the IR laser into two equal power components and transmits one and reflects the other. The reflected beam then reflects off of the mirror and exits the POD. The beamsplitter and mirror are adjusted to provide the desired beam angle. The advantage of this arrangement is that only one IR laser is used, thus saving in cost, component count, and space. However this laser must be more powerful than those used in the two-laser arrangement (approximately twice the power) and additional optical components are needed.

Note that the visible alignment laser may be included in either the single or two-laser embodiments, and that some or all of the receiver/transmitter components may be housed separately from the lasers. For example, in an alternative embodiment, the optical components of the p-POD are contained in an enclosure that resides near the projector and the receiver components are contained in a small enclosure that plugs into a computer input port (e.g., a USB dongle device). In this arrangement, the Handset and receiver communicate with each other, and the p-POD is used only to project the reference markers onto the screen. The p-POD would then have its own power source and switch. If it is desirable to communicate and control the lasers in the p-POD remotely, then a micro-controller and wireless chip could be included with the p-POD. This arrangement might be desirable in situations where the projector and computer are located far from each other.

In one embodiment, the laser beam vectors are slightly diverging (as shown in FIGS. 5 and 6) and the lasers are co-located with the projector. In this way, the farther away the projector and p-POD are placed from the screen, the larger the image is and the greater the separation of the projected IR spots will be. Moreover, the spot separation will scale in proportion with the image size. In this case, the spot separation can be used to directly calibrate the handset to the screen and no additional pointing and screen calibration, as described in the co-pending applications referenced above, will be required during setup. This is because the ratio of the marker separation and screen size is always the same. Ordinarily, using the standard fixed-marker arrangement, some type of initial pointing calibration is needed because there is no a priori knowledge of the screen size and no fixed relationship between the marker separation (i.e., size of the POD) and the screen dimensions. Furthermore, by pointing the IR laser beams to the center of the screen, the WavIt system's angular operational range will be maximized. This is preferable to placing the spots above or beneath the screen which is the practical limitation of a normal emission-based POD that is not allowed to block the screens image.

Other configurations for the lasers and IR spots are possible. For example, according to one embodiment, the lasers may be mounted such that the divergence between the beams is in the vertical plane instead of the horizontal plane, thus producing spots that are arranged vertically on the screen, or any combination of horizontal and vertical displacement between the beams (e.g., spots arranged diagonally on the screen) is also possible. Other geometries include ones in which the beams from the two lasers cross and then diverge before reaching the screen or simply converge from the p-POD and do not cross before hitting the screen.

The infrared spots that are projected onto a normal screen will tend to scatter in the same way that the visible light does. This means that for normal screens there will be near Lambertian scatter of the incident light from the p-POD, which will mean that the spots will be visible from very large angles to the screen. In addition, many projection screens (rear projection in particular) are designed to have asymmetric scattering of the incident light in order to increase the viewing angle, typically in the horizontal plane. Such screens will also work well with the p-POD system since, in general, similar non-uniform scattering will increase the operational region (both in angle and distance from the screen) for the WavIt system.

Another benefit of projected spots is that they are relatively easily tailored without the same physical constraints that govern the design of a regular emissive POD. For example, according to certain embodiments, the projected spots can be made bigger without impacting the size of the p-POD. Shaped spots, such as lines and crosses can be projected into various corners of the screen. Larger and shaped spots may be more easily resolved by the detection system in the Handset and thus provide additional information. Multiple spots could be arranged in a circle. The benefit of this is, for example, that if the spots are arranged into a large circle, then the aspect ratio of the circle, which is more accurately determined, could help the WavIt Handset determine its location in the room. For example, a tall oval shape would indicate that the user is positioned to the left or right of the screen and not directly in front. A flat oval would indicate that he is positioned above or below the screen.

Multiple arrangements of spots (and/or their powers) can be used to break the symmetry to allow for discerning whether the user is to the right or left of the screen. For example, a four-marker arrangement in which the separation between the markers on the screen is a non-negligible fraction of the user's distance from the screen can permit the distinction between left and right view angle. This can be done using one or more of at least two properties of the markers—their apparent separation (the spot separation on the Handset sensor) and their detected powers. In essence, the pair of markers that are closer to the Handset will both have a larger separation and stronger signal strengths. The side of the screen on which the user is located will determine which pair of spot images is stronger and/or farther apart. The procedures for determining various degrees of freedom using multiple marker configurations are described in detail in the pending applications previously referenced. Returning to the two spot geometry, it is also now more feasible to place the spots much farther apart (perhaps even the length the screen). In addition to permitting better view angle resolution as described above (by using the difference in the received power between the pairs of spots), this has the benefit of improving the resolution of the measurement of distance from the WavIt to the screen since the Handset uses the spot separation to gauge distance from Handset to the screen. It also improves the resolution of the roll angle (the angle of rotation of the WavIt about the axis perpendicular to the sensor surface).

In one embodiment, the WavIt handset can be modified to have a very narrowband laser-line band-pass 980 nm filter. This allows light only of very close spectral proximity to 980 nm to pass through to the image sensor. A continuous-wave (CW) 980 nm laser usually has a bandwidth of much less than 1 nm, in comparison to an LED, whose spectrum normally spans >10 nm. This means that the system can be made much more optically robust to spurious light sources, such as room lights, essentially increasing the inherent signal to noise ratio of the system.

In one embodiment, the p-POD contains two 35 mW 980 nm diode laser sources that each use ~70 mA with an operating voltage of 3.2V. This is well within the power limit of the USB port of a PC which can support 500 mA at 5V.

While it is noted that an alternative arrangement is possible in which the laser is placed in the Handset and/or the camera is fixed on the table or onto the projector, this "reverse" configuration suffers from a few weaknesses: 1) it does not lend itself very well to non-interfering robust multi-user operation because it will be difficult to distinguish which spots belong to which user without a much more computationally intensive and expensive image analysis system, and 2) it involves placing lasers in a handset where free hand motion is more likely to direct potentially dangerous laser beams into unsuspecting eyes, 3) the lasers consume more power (~150 mA at 3.3V, or ~500 mW) and hence would require much more regular recharging when compared to the <20 mA (or ~70 mW) for a WavIt optical tracking handset, 4) the lasers are significantly more expensive than an optical sensor, and 5) the space requirement for two lasers is generally greater than that for a single image sensor and thus would add to the size of the Handset.

According to one embodiment of the invention, the p-POD WavIt system is compatible with the regular WavIt POD system in that no modifications need be made to the WavIt Handset. This also means that all the regular benefits of WavIt tracking system apply. For example, it allows for non-interfering robust multi-user operation, and the handset remains relatively low cost, low power, and robust with a very small form factor.

Note that, although we have discussed primarily the use of a p-POD configuration for front projectors, it is clear to those with ordinary skill in the art that the same principle applies equally to a rear-projection TV system, in which the lasers, or other projected IR light sources, are mounted inside the TV and the spots are projected onto the back-side of the TV screen along with the normal projected picture.

Figure 7B:
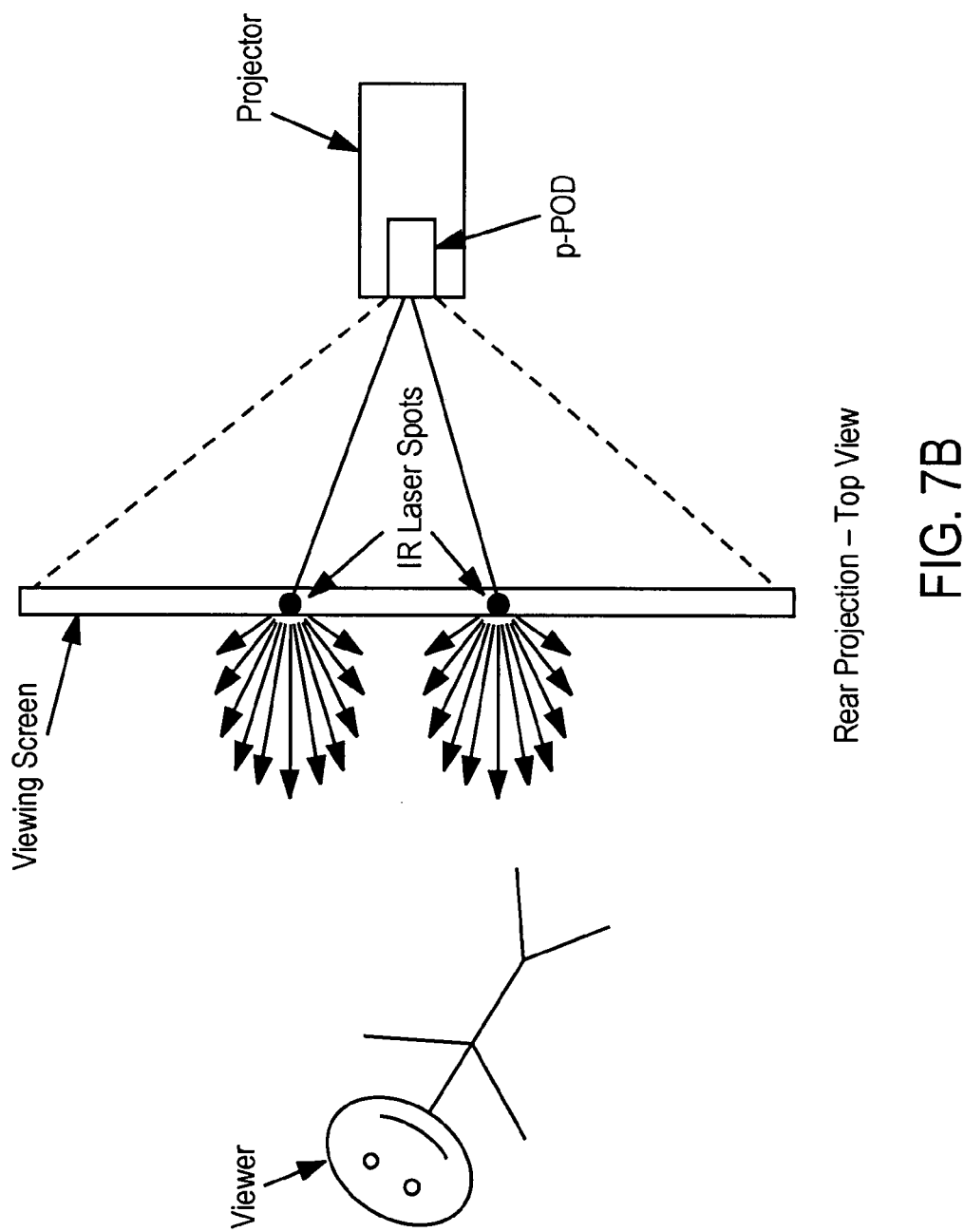

FIGS. 7A and 7B show a rear projection pointing system using a p-POD according to certain embodiments. The side view is shown in FIG. 7A and the top view is shown in FIG. 7B. There are several different optical arrangements that can be used for rear projection video systems. FIGS. 7A and 7B illustrate the use of the p-POD in a conventional folded geometry, a standard arrangement for rear projection systems. In order to preserve space behind the screen, according to one embodiment, mirrors may be used to direct the expanding cone of light from the projector onto the back of the viewing screen as shown in FIG. 7A. Light incident on the screen is scattered in the general direction of the viewer. This is the basic operational principle for many large screen rear projection televisions (RPTVs).

In traditional RP systems, the screen is designed to scatter the light isotropically. More recently, systems are designed so that the front surface of the viewing screen scatters the incident light asymmetrically in the horizontal and vertical directions. This is done in order to make more efficient use of the available light since typical viewers will not be located at large vertical angles with respect to the screen. Advanced technologies such as Fresnel lenses and lenticular arrays are used to produce asymmetrically scattering screens.

There are several different arrangements that could be employed for the incorporation of the p-POD based absolute pointing device into an RP system. The one shown in FIGS. 7A and 7B is essentially the equivalent of that shown in FIGS. 5 and 6 for a front projection system. According to one embodiment, the p-POD is mounted adjacent to the projector or projection unit and the projected IR marker spots are positioned near the middle of the screen. In systems that employ asymmetrically scattering screens, the IR light will be scattered asymmetrically in a manner similar to the visible light, as indicated in FIGS. 7A and 7B.

The vision system in the Handset held by the viewer will see two spots located near the center of the screen and displaced horizontally with respect to each other, as shown in FIG. 7B. The view angle for the system (wide in the horizontal plane and narrower in the vertical plane) will be similar to that for a normal viewer. Other positions for the p-POD are possible. The p-POD could be mounted just below mirror 2 and pointed directly at the back of the screen at a slight angle such that the IR spots hit near the screen center. This arrangement would reduce any losses incurred upon reflections from the mirrors and obviate the need for mirrors with high reflectivity in the IR. Alternatively, the p-POD could be placed behind one of the mirrors with the beams directed at the screen center. In this case, the mirror behind which the POD is placed would have to be transparent to the IR. Other arrangements that produce the desired spot pattern may also be possible. Note that the folding mirrors are not shown in FIG. 7B, but the essence of the arrangement regarding the placement of the p-POD and the IR spots is not affected. Other configurations may exist.

In addition to standard RPTV systems, laser-based projection TVs are another, recently-developed, type of display system in which the p-POD may be integrated. The main difference between standard RP and laser-based RP displays is the type of light source. Instead of filtered lamp light or, in some cases, visible LEDs, laser-based displays use lasers as the source of illumination. The main advantages of laser-based displays are higher efficiency, smaller size and weight, longer lifetime, and superior color gamut compared with conventional projection systems. Although still in their infancy, laser-based TVs and displays are anticipated to become more prevalent over the next several years due to the continuing improvements in the quality and cost of the component solid state lasers used as the sources.

Laser-based projection displays (both front and rear) are potentially ideally suited for incorporation of a laser-based p-POD as the source of the reference markers for use with a WavIt pointing device. In typical laser-based displays, at least one of the three component visible light sources (red, green, and blue) is derived from an IR laser source. For example, typically, the blue light is obtained by frequency doubling of a near-IR laser, although in some cases, the green and/or the red are also derived from an IR source via second-harmonic generation. This is done because of the difficulty and inefficiency in generating shorter wavelength (e.g. blue) laser light directly. A typical wavelength range for the blue component is 430 nm-490 nm, which places the fundamental wavelength in the 860 nm-980 nm range. This light is typically not used and must be blocked or filtered out of the projection system. However, this range is nearly ideal as a near-IR source of marker light. Furthermore, because of the relatively low conversion efficiency in the frequency-doubling process (<50%), there is available a high power source of residual ~920 nm laser light that is otherwise wasted. The only additional components necessary to use the IR light may be collimating, beam steering, and beam splitting optics to separate the IR from the visible light, split it into the desired number of beams (one for each marker), shape the beams as needed, and direct them to the screen.

Note that, although the use of available IR light is ideal in many ways, it may not be practical in some systems. In such cases, an external IR source may be added to the system, as shown in FIGS. 4 and 7. Finally note that, although integration with laser-based displays may be a natural application of the p-POD, the system will work equally well in projection displays based on conventional light sources.

The preferred embodiments described thus far involve the use of one or more IR lasers as the source of the projected marker light in the p-POD. Lasers are generally preferred primarily because of their superior optical properties. In particular, their inherent brightness (or radiance) is typically many orders of magnitude larger than for incoherent light sources such as LEDs and lamps. This fact results in the ability to more efficiently collect the emitted light from the source and project to a target (e.g., a wall or screen). In some cases, however, it may be necessary or desirable to use more conventional sources such as IREDs, either for cost or safety reasons. Because of the inherently larger radiance associated with lasers, it is not practical for an IRED-based p-POD to produce the same signal level in a WavIt Handset as a laser-based p-POD with the same optical power. However, it is conceivable, depending on the details of the system, to design a p-POD based on IREDs or other incoherent light sources. The relevant system details include the image detection method in the Handset, the required optical power and beam size, and the distance between the p-POD and the screen.

The radiance of an optical source cannot be increased during transmission through an optical system, and because the inherent radiance of LEDs is much smaller than that of lasers, it is generally difficult to achieve the same amount of detectable optical power scattered off of the screen using LEDs versus using lasers with the same source power. There are a few approaches, however, that may permit the use of LED-based p-PODs in some situations. Note that one of the relevant parameters for determining the signal level is the amount of light from the source that is scattered in the direction of the Handset and not necessarily the radiance of the source. Therefore, even though the radiance of LEDs is much smaller than that of lasers, it is still conceivable that they can be used in some situations. In most cases, what matters more than the radiance (e.g., $W/cm^2$-Sr) is the irradiance (e.g., $W/cm^2$) of the projected light at the target. This is because the incident light is typically scattered uniformly at the screen, regardless of the source. Therefore, depending on the required spot size, LEDs may provide sufficient signal strength. The required spot size (or range of spot sizes) will depend on several factors including the detection method, the sensor resolution, and the operating distance.

In general, because of the radiance limitations, it is impractical to maintain sufficiently small spot sizes when the p-POD is located far from the screen (typically more than ~1 meter) without sacrificing optical power. In such cases, the irradiance at the screen may be increased in one of two ways. Increasing the size of the projection optics (e.g., refractive and/or reflective elements) will decrease the target spot size, thereby increasing the irradiance. However, in many cases, the required optic size would be impractically large. It is also possible to attempt to collimate or focus the light from the LED (or other incoherent light source) to obtain a smaller spot. However, in order to achieve a sufficiently small spot containing a significant fraction of the optical power from the LED, the required optical system would also be impractically large (in length and height). The other option is to simply increase the power projected to the target area by adding additional sources and directing their projected beams to the desired location. Of course, this approach also requires a larger effective size for the p-POD and the addition of more sources which results in higher power requirements and additional cost.

A specific example of an LED-based p-POD uses, for each marker, three separate LEDs, each of which has a narrow divergence angle (<10° is typically achievable for a 5 mm diameter device). The LEDs may be oriented so that their beams have maximum overlap at the target location which may be 1-3 meters away depending on the details of the display system (e.g., front vs rear projection). Additional optics may be added to the system to further reduce the spot size (subject to the inherent radiance limits of the source). In general, the further the p-POD is from the screen, the larger the optics must be to maintain the same irradiance. Using a set of three standard high-power (e.g., 35 mW) IREDs for each marker would result in a ~100 mW of total power contained in a spot size of ~10 cm for a screen ~1 meter away. The corresponding irradiance of ~1.3 mW/cm$^2$ is to be compared with ~7.5 mW/cm$^2$ for a 35 mw laser spot of ~2.5 cm diameter. The larger the acceptable spot size for the marker, the more feasible the LED-based p-POD approach becomes since more of the available power is used. The maximum acceptable spot size will depend on factors such as the detection method and the acceptable separation between the two projected markers. In some detection methods, the signal on the image sensor is saturated such that the detected image size is much larger than the actual image size. In such cases, broadening the marker size on the screen can be done without significantly affecting the quality of the detected signal. In fact, in some cases, the signal may be improved (larger and/or more stable) by increasing the spot size whether using a laser or LED. The upper limit on spot size is ultimately determined by the maximum operating distance of the Handset since the images on the sensor approach each other as the user moves farther away from the screen. If the spots are too large then they will become too close to each other on the sensor to resolve for sufficiently large operating distances.

Figure 8:
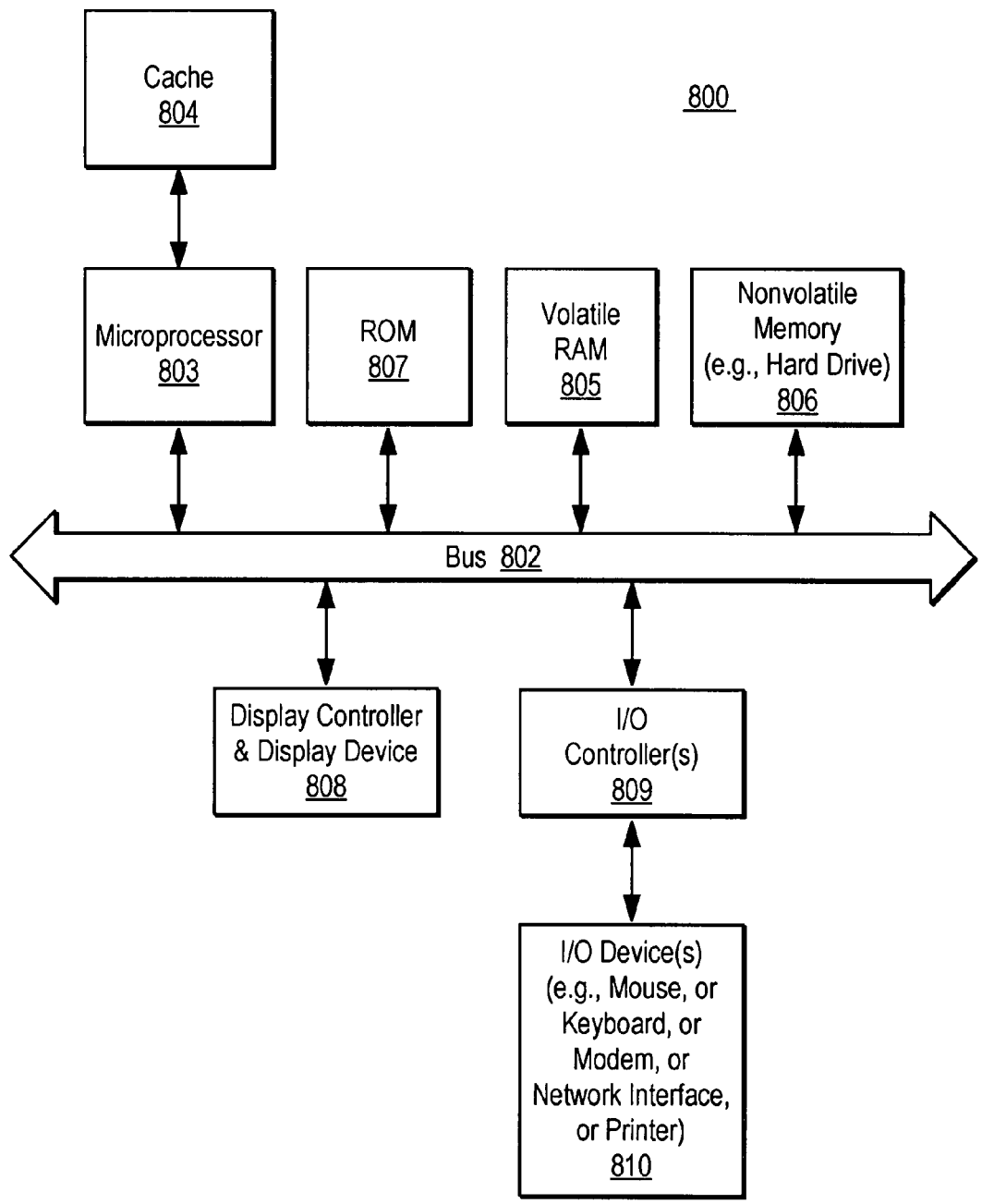
FIG. 8 is a block diagram illustrating a data processing system which may be used with one embodiment of the invention.

FIG. 8 is a block diagram of a digital processing system, which may be used with one embodiment of the invention. For example, the system 800 shown in FIG. 8 may be used as a computer system described above, such as, for example, a host computer, a projector, a POD, and/or a handheld device, etc.

Note that while FIG. 8 illustrates various components of a computer system, it is not intended to represent any particular architecture or manner of interconnecting the components, as such details are not germane to the present invention. It will also be appreciated that network computers, handheld computers, cell phones, set-top boxes, digital TVs, and other data processing systems which have fewer components or perhaps more components may also be used with the present invention. The computer system of FIG. 8 may, for example, be an Apple Macintosh computer or an IBM compatible PC.

As shown in FIG. 8, the computer system 800, which is a form of a data processing system, includes a bus 802 which is coupled to a microprocessor 803 and a ROM 807, a volatile RAM 805, and a non-volatile memory 806. The microprocessor 803, which may be, for example, a PowerPC G4 or PowerPC G5 microprocessor from Motorola, Inc. or IBM, is coupled to cache memory 804 as shown in the example of FIG. 8. Microprocessor 803 may include multiple processors or multiple core logics (e.g., logical processors). The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 8 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Methods and apparatuses for free-space multi-dimensional absolute pointer using a projection marker system have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method, comprising:
    capturing an image of two or more spatially fixed optical spots projected onto a display surface, the display surface displaying machine generated content capable of being manipulated via a cursor of a pointing device, wherein the images of the two or more optical spots is captured wirelessly using a handheld device representing the pointing device for which the optical spots serve as reference markers; and
    generating in the handheld device separate image data for each of the two or more spots within the image;
    processing in the handheld device the separate image data for each of the spots within the image to generate coordinate data for each of the spots within the image;
    wherein processing the image data further comprises:
    determining an intensity value for each of a plurality of pixels of the pixelated sensor;
    identifying a set of pixels in which each pixel has an intensity value above a specified threshold;
    generating coordinate data based on the intensity value and the location of each of the pixels in the set of pixels;
    transmitting from the handheld device the coordinate data derived from the processing of the image data;
    wherein a position of the cursor of the pointing device displayed on the display surface is determined and actively controlled based on the coordinate data transmitted from the handheld device.

2. The method of claim 1, wherein the two or more optical spots are projected from an apparatus from which the machine generated content is projected.

3. The method of claim 2, further comprising in response to the coordinate data of the handheld device in view of the captured images of the optical spots received from the handheld device, calculating the coordinates of the cursor based on the coordinate data of the handheld device in view of the position of the two or more optical spots.

4. The method of claim 3, further comprising displaying a cursor on the display surface at a position based on the calculated coordinates of the cursor.

5. The method of claim 4, wherein the projection apparatus is configured to wirelessly receive the coordinate data from the handheld device and to calculate the coordinates of the cursor.

6. The method of claim 4, wherein the projection apparatus is physically separated from wireless receiving electronics that receive the coordinates of the handheld device and calculate the coordinates of the cursor such that the projection apparatus and receiving electronics may be housed in distinct locations from each other and the display surface.

7. The method of claim 2, wherein the projection apparatus comprises one or more coherent sources of optical radiation.

8. The method of claim 2, wherein the projection apparatus comprises one or more incoherent sources of optical radiation.

9. The method of claim 1, wherein the two or more optical spots are displayed according to a predetermined optical frequency such that the two or more optical spots are invisible to a user looking at the display surface.

10. The method of claim 1, wherein the image of the two or more optical spots is captured using a camera embedded within the handheld device.

11. The method of claim 1, further comprising calibrating initial coordinates of the handheld device by pointing the handheld device to one or more predetermined locations within or near a display area in view of positions of the two or more optical spots.

12. A non-propagating machine-readable medium having instructions stored therein, which when executed by a processor, cause the processor to perform a method, the method comprising:
    Capturing an image of two or more spatially fixed optical spots projected onto a display surface, the display surface displaying machine generated content capable of being manipulated via a cursor of a pointing device, wherein the images of the two or more optical spots is captured wirelessly using a handheld device representing the pointing device for which the optical spots serve as reference markers; and
    generating in the handheld device separate image data for each of the two or more spots within the image;
    processing in the handheld device the separate image data for each of the spots within the image to generate coordinate data for each of the spots within the image;
    wherein processing the image data further comprises:
    determining an intensity value for each of a plurality of pixels of the pixelated sensor;

identifying a set of pixels in which each pixel has an intensity value above a specified threshold;

generating coordinate data based on the intensity value and the location of each of the pixels in the set of pixels;

transmitting from the handheld device the coordinate data derived from the processing of the image data;

wherein a position of the cursor of the pointing device displayed on the display surface is determined and actively controlled based on the coordinate data transmitted from the handheld device.

13. The machine-readable medium of claim 12, wherein the two or more optical spots are projected from an apparatus from which the machine generated content is projected.

14. The machine-readable medium of claim 13, wherein the method further comprises in response to the coordinate data of the handheld device in view of the captured images of the optical spots received from the handheld device, calculating the coordinates of the cursor based on the coordinates data of the handheld device in view of the position of the two or more optical spots.

15. The machine-readable medium of claim 14, wherein the method further comprises displaying a cursor on the display surface at a position based on the calculated coordinates of the cursor.

16. The machine-readable medium of claim 15, wherein the projection apparatus is configured to wirelessly receive the coordinate data from the handheld device and to calculate the coordinates of the cursor.

17. The machine-readable medium of claim 16, wherein the projection apparatus is physically separated from wireless receiving electronics that receive the coordinates of the handheld device and calculate the coordinates of the cursor such that the projection apparatus and receiving electronics may be housed in distinct locations from each other and the display surface.

18. The machine-readable medium of claim 15, wherein the projection apparatus comprises one or more coherent sources of optical radiation.

19. The machine-readable medium of claim 15, wherein the projection apparatus comprises one or more incoherent sources of optical radiation.

20. The machine-readable medium of claim 12, wherein the two or more optical spots are displayed according to a predetermined optical frequency such that the two or more optical spots are invisible to a user looking at the display surface.

21. The machine-readable medium of claim 12, wherein the image of the two or more optical spots is captured using a camera embedded within the handheld device.

22. The machine-readable medium of claim 12, wherein the method further comprises calibrating initial coordinates of the handheld device by pointing the handheld device to one or more predetermined locations within a display area in view of positions of the two or more optical spots.

23. A presentation system comprising:

a projection apparatus to project two or more spatially fixed optical spots on a display surface for displaying machine generated content capable of being manipulated via a cursor of a pointing device;

a handheld device representing the pointing device to wirelessly capture an images of each of the two or more optical spots projected onto the display surface, the optical spots serving as reference markers for the pointing device;

the handheld device further adapted to generate separate image data for each of the two or more spots within the image, process the separate image data for each image to generate coordinate data for each spots within the image, and transmit from the handheld device the coordinate data derived from the processing of the image data;

wherein processing the image data for each image further comprises: determining an intensity value for each of a plurality of pixels of the pixelated sensor;

identifying a set of pixels in which each pixel has an intensity value above a specified threshold; and generating coordinate data based on the intensity value and the location of each of the pixels in the set of pixels; and a control unit communicatively coupled to the projection apparatus and the handheld device to determine and actively control a position of the cursor based on the coordinate data transmitted from the handheld device.

24. The system of claim 23, wherein the two or more optical spots are projected in a predetermined optical frequency such that the two or more optical spots are invisible to a user of the display surface.

25. The system of claim 24, wherein the handheld device comprises a camera to capture an image of each of the two or more optical spots.

* * * * *